US008178461B2

(12) United States Patent
Odueyungbo

(10) Patent No.: US 8,178,461 B2
(45) Date of Patent: May 15, 2012

(54) THERMAL TREATMENT PROCESSES FOR SPENT HYDROPROCESSING CATALYST

(75) Inventor: Seyi A. Odueyungbo, Hercules, CA (US)

(73) Assignee: Chevron U.S.A. Inc, San Ramon, CA (US)

( * ) Notice: Subject to any disclaimer, the term of this patent is extended or adjusted under 35 U.S.C. 154(b) by 727 days.

(21) Appl. No.: 12/345,826

(22) Filed: Dec. 30, 2008

(65) Prior Publication Data

US 2010/0167912 A1 Jul. 1, 2010

(51) Int. Cl.
*B01J 38/02* (2006.01)

(52) U.S. Cl. .......................... 502/56; 502/514; 502/518

(58) Field of Classification Search .................. 502/56, 502/20, 439, 23, 24, 514, 518
See application file for complete search history.

(56) References Cited

U.S. PATENT DOCUMENTS

| | | | |
|---|---|---|---|
| 4,434,043 A | 2/1984 | Singhal et al. | |
| 4,661,265 A | 4/1987 | Olson et al. | |
| 4,756,821 A | 7/1988 | Giuliani et al. | |
| 4,855,491 A | 8/1989 | Chew et al. | |
| 5,183,572 A | 2/1993 | Benn et al. | |
| 5,484,201 A | 1/1996 | Goolsbee | |
| 5,490,936 A | 2/1996 | Leupold et al. | |
| 5,578,213 A | 11/1996 | Miller et al. | |
| 5,788,724 A | 8/1998 | Carygati et al. | |
| 5,928,518 A | 7/1999 | Schafer-Treffenfeldt | |
| 6,514,418 B1 | 2/2003 | Bartscherer et al. | |
| 6,749,752 B2 | 6/2004 | Trout | |
| 6,974,842 B1 | 12/2005 | Spena et al. | |
| 2008/0000809 A1 | 1/2008 | Wang et al. | |
| 2008/0135450 A1 | 6/2008 | Reynolds et al. | |
| 2008/0139379 A1 | 6/2008 | Reynolds et al. | |
| 2008/0139380 A1 | 6/2008 | Reynolds et al. | |
| 2008/0156700 A1 | 7/2008 | Abulnaga et al. | |

FOREIGN PATENT DOCUMENTS

EP 0148024 A3 7/1985

OTHER PUBLICATIONS

PCT International Search Report on PCT/US2008/087682 mailed Jul. 1, 2010.
Pending related case U.S. Appl. No. 12/345,904, filed Dec. 30, 2008.
Pending related case U.S. Appl. No. 12/345,981, filed Dec. 30, 2008.
Pending related case U.S. Appl. No. 12/346,323, filed Dec. 30, 2008.
Pending related case U.S. Appl. No. 12/346,480, filed Dec. 30, 2008.
VSEP treatment of RO Reject from Brackish Well Water, Johnson et al.. Technical article from New Logic Rsearch, Inc. 2006 El Paso Destination Coniderence, El Paso.
VSEP Brochure from New Logic Research.

*Primary Examiner* — Edward Johnson

(57) ABSTRACT

A process to upgrade heavy oil and convert the heavy oil into lower boiling hydrocarbon products is provided. The process employs a catalyst slurry comprising catalyst particles with an average particle size ranging from 1 to 20 microns. In the upgrade process, spent slurry catalyst in heavy oil is generated as an effluent stream, which is subsequently recovered/separated from the heavy oil via membrane filtration. Residual hydrocarbons, i.e., heavy oil and solvent employed in the filtration for the heavy oil extraction are removed from the catalyst particles in a drying zone which employs at least two drying apparatuses to volatize residual hydrocarbons in the catalyst. Valuable metals can be recovered from catalyst particles for subsequent re-use in a catalyst synthesis unit, generating a fresh slurry catalyst.

13 Claims, 17 Drawing Sheets

THERMAL TREATMENT PROCESSES FOR SPENT HYDROPROCESSING CATALYST

RELATED APPLICATIONS

NONE.

BACKGROUND

As light oil reserves are gradually being depleted and the costs of development (e.g., lifting, mining, and extraction) of heavy oil resources have increased, a need has arisen to develop novel upgrading technologies to convert heavy oils and bitumens into lighter products. With the advent of heavier crude feedstock, refiners are forced to use more catalysts than before to upgrade the heavy oil and remove contaminants/ sulfur from these feedstocks. These catalytic processes generate huge quantities of spent catalyst. With the increasing demand and market price for metal values and environmental awareness thereof, catalysts can serve as a secondary source for metal recovery.

In order to recycle/recover catalytic metals and provide a renewable source for the metals, efforts have been made to extract metals from spent catalysts generated from heavy oil upgrade processes, whether in supported or bulk catalyst form. Before catalytic metals can be extracted/recovered from spent catalysts, residual heavy oil from hydroprocessing operations has first to be separated from the spent catalysts. Effluent streams from heavy oil upgrade system typically contain unconverted heavy oil materials, heavier hydrocracked liquid products, slurry catalyst ranging from 3 to 50 wt. %, small amounts of coke, asphaltenes, etc. Conventional filtration processes may not be suitable to separate/recover slurry catalyst from high molecular weight hydrocarbon materials in the effluent streams as the unsupported fine catalyst may cause plugging or fouling of filters.

Membrane technology has long been used in removal of contaminants in environmental clean-up, wastewater treatment and water purification, particularly with the use of microfiltration, ultrafiltration, nanofiltration and reverse osmosis. Nanofiltration has more recently been used to purify/remove impurities such as vanadium (in ppm amounts) from low boiling hydrocarbon mixtures boiling such as kerosene.

Heavy oil exposed to hydrocracking conditions is particularly difficult to extract/remove/separate from slurry catalyst. Conventional solvent extraction and roasting methods in the prior art do not work particularly well with slurry catalyst, leaving heavy oil behind with the catalyst particle, thus creating problems in the downstream metal recovery process (recovering valuable metals from spent catalyst). Some chemicals in the residual entrained oil in catalyst particles cause foaming issues during the metals recovery process and negatively impact any attempts at metals recovery using chemical extraction, pressure leaching, metal digestion/solubilization, crystallization, and or precipitation methodologies.

The present invention relates to novel applications of membrane technology in separating and/or extracting residual heavy oil from spent catalyst particles generated from heavy oil upgrade operations, and subsequently removing residual heavy oil from catalyst particulates to less than 0.5 wt. % in one embodiment.

SUMMARY

In one aspect, the invention relates to a system for separating heavy oil from catalyst particles is provided with a drying zone comprising at least two drying stages, with the $2^{nd}$ drying stage for the volatilization of organic matters, e.g., hydrocarbons such as solvent and heavy oil, from the catalyst particles. In one embodiment, the first drying stage is a combined horizontal and vertical wiped-film dryer/evaporator and the second stage is a rotary kiln dryer. In one embodiment, the rotary kiln dryer is operated at a sufficiently high temperature to volatize organic matters such as carboxylates bound to the surface of the catalyst particles.

In yet another aspect, the invention relates to a process for separating heavy oil from catalyst particles is provided. The process comprising: drying a composition containing comprising catalyst particles and 50 to 90 wt. % hydrocarbons in a drying zone comprising at least two drying stages, with the $2^{nd}$ drying stage for the volatilization of the organic matters, e.g., solvent and heavy oil, from the catalyst particles; and removing the catalyst particles from the drying zone as a dry powder.

BRIEF DESCRIPTION OF THE DRAWING FIGURES

DETAILED DESCRIPTION

Figure 1B:
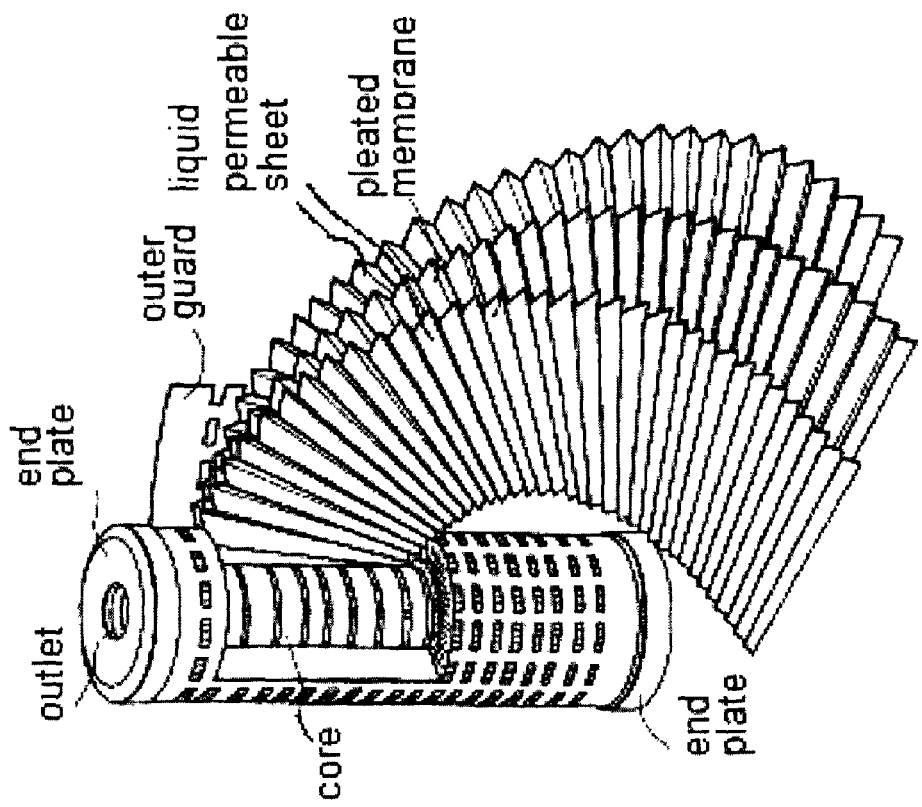
FIG. 1B is a partially developed view showing an embodiment of a membrane filtration system with a pleated membrane structure.

The following terms will be used throughout the specification and will have the following meanings unless otherwise indicated.

"Average flux" refers to a time weighted average flux measured over a particular concentration range.

"Batch concentration" refers to a dynamic filtration system, e.g., a Vibratory Shear Enhanced Processing (V*SEP) machine configuration, where a fixed amount of feed slurry is progressively concentrated by removal of permeate from the system. The concentrate from the system is returned to a feed tank.

"Concentrate," also known as "retentate," refers to the portion of slurry that does not permeate through a filter medium, e.g., a membrane. Stated otherwise, it is the portion of slurry which does not filter through the membrane.

"Concentration factor" refers to a ratio of feed flow rate to concentrate flow rate.

"Cross-flow" filtration (or crossflow filtration or tangential flow filtration (TFF)) refers to a filtration technique in which the feed stream flows (parallel or tangentially) along the surface of the membrane and the filtrate flows across the membrane. In cross-flow filtration, typically only the material which is smaller than the membrane pore size passes through (across) the membrane as permeate or filtrate, and everything else is retained on the feed side of the membrane as retentate or concentrate. In one embodiment of cross-flow filtration, only a portion of the liquid in the solids-containing stream passing through the filter medium, i.e., the membrane. In contrast, in conventional filtration (dead-end filtration or normal filtration), the entire liquid portion of the slurry, rather than just a fraction of the liquid, is forced through the membrane, with most or all of the solids retained by the membrane.

"Diafiltration" (DF) refers to a cross-flow filtration process wherein a buffer material, e.g., a solvent, is added into the feed stream and/or the filtering process while filtrate is removed continuously from the process. In one embodiment of diafiltration, the process is used for purifying retained large molecular weight species, increasing the recovery of low molecular weight species, buffer exchange and simply changing the properties of a given solution. Diafiltration can be in the form of batch diafiltration or continuous diafiltration. In batch DF, the retentate is concentrated to the original volume or up to a certain concentration of the slurry catalyst in the retentate. Once this concentration is reached, another volume of feed stream is added. In continuous DF, the volume of feed stream (solvent and catalyst slurry in heavy oil) is added to the filtration process at the same flow rate at which the filtrate and the concentrate are being removed. By this method, the volume of the fluid in the process can be kept constant while the smaller molecules, e.g., heavy oil in solvent, which can permeate through the filter are washed away in the filtrate.

"Dynamic filtration" is an extension of cross-flow filtration, wherein the filter medium is kept essentially free from plugging or fouling by repelling particulate matter from the filter element and by disrupting the formation of cake layers adjacent to the filter medium. These results are accomplished by moving the material being filtered fast enough relative to the filtration medium to produce high shear rates as well as high lift forces on the particles, such as by use of rotary, oscillating, reciprocating, or vibratory means. The shear at the fluid-filter medium interface is nearly independent of any crossflow fluid velocity, unlike tangential or crossflow filtration techniques (which suffer from other problems such as premature filter plugging due to compound adsorption and large and nonuniform pressure drops associated with high tangential velocities along the filter length, potentially causing backflow through the filtration medium and reducing filtration).

"Microfiltration" refers to a membrane filtration process in which hydrostatic pressure forces a liquid against a membrane, employing microporous membranes, i.e., membranes with pore size in the micron ranges. Microfiltration can be in the form of cross-flow filtration, diafiltration, or dynamic filtration. In one embodiment, the membrane size is less than 100 nm. In another embodiment, the membrane size ranges from 0.01 to 10 microns (10 to 10,000 nanometers). In one embodiment, membranes of sufficient sizes are used for particles greater than or equal to 0.1 μm or 500,000 daltons in size or weight, are retained.

"Nanofiltration" refers to a membrane filtration process operates at a low to moderately high pressure (typically>4 bar, or in the range of 50-450 psig), employing filters with very small pore sizes, i.e., nanofilters with membranes having a pore size in the order of nanometers (1 nanometer=10 angstroms or 0.001 microns).

"Feed" may be used interchangeably with "feed slurry," refers to a mixture comprising heavy oil and spent slurry catalyst, offered for filtration. The feed typically has suspended solids or molecules, which are to be segregated from a clear filtrate and reduced in size, making a concentrated solution of feed slurry.

"Fouling" refers to accumulation of materials on a membrane surface or structure, which results in a decrease in flux.

"Flux" refers to a measurement of the volume of fluid that passes through a membrane during a certain time interval for a set area of membrane (i.e., gallons of permeate produced per $ft^2$ of membrane per day (gfd) or liters per $m^2$ per hour).

"Instantaneous flux" refers to flux measured at a given moment in time.

"Line-Out Study" refers to a procedure of measuring membrane flux over time in order to determine eventual stability.

"Optimum differential pressure" refers to a differential pressure value above which the rate of change of flux with time, or the productivity of the filtration system, decreases.

"Percent recovery" refers to a ratio of permeate flow rate to feed flow rate.

"Permeate," also known as "filtrate," refers to the portion of slurry that percolates through a membrane. The amount of solids and the particle size of solids contained in the filtrate are determined by the pore size of the discriminating membrane, among other factors.

"Surfactant" or "surface acting agent" refers to any compound that reduces surface tension when dissolved or suspended in water or water solutions, or which reduces interfacial tension between two liquids, or between a liquid and a solid. In a related aspect, there are at least three categories of surface active agents: detergents, wetting agents, and emulsifiers; all use the same basic chemical mechanism and differ, for example, in the nature of the surfaces involved.

"Detergent" refers to an emulsifying agent or surface active agent made usually by action of alkali on fat or fatty acids, such as, but not limited to, the sodium or potassium salts of such acids, or sulfonates which are formed when sulfonic acid is reacted with alkanes. In one embodiment, detergent may include any of numerous synthetic water-soluble or liquid organic preparations that are chemically different from soaps but are able to emulsify oils, hold dirt in suspension, and act as wetting agents.

"Heavy oil" refers to heavy and ultra-heavy crudes, including but not limited to resids, coals, bitumen, tar sands, etc. Heavy oil feedstock may be liquid, semi-solid, and/or solid. Examples of heavy oil feedstock that might be upgraded as described herein include but are not limited to Canada Tar sands, vacuum resid from Brazilian Santos and Campos basins, Egyptian Gulf of Suez, Chad, Venezuelan Zulia, Malaysia, and Indonesia Sumatra. Other examples of heavy oil feedstock include bottom of the barrel and residuum left over from refinery processes, including "bottom of the barrel" and "residuum" (or "resid")—atmospheric tower bottoms, which have a boiling point of at least 343° C. (650° F.), or vacuum tower bottoms, which have a boiling point of at least 524° C. (975° F.), or "resid pitch" and "vacuum residue"— which have a boiling point of 524° C. (975° F.) or greater. Properties of heavy oil feedstock may include, but are not limited to: TAN of at least 0.1, at least 0.3, or at least 1; viscosity of at least 10 cSt; API gravity at most 20 in one embodiment, and at most 10 in another embodiment, and less than 5 in another embodiment. A gram of heavy oil feedstock typically contains at least 0.0001 grams of Ni/V/Fe; at least 0.005 grams of heteroatoms; at least 0.01 grams of residue; at least 0.04 grams C5 asphaltenes; at least 0.002 grams of MCR; per gram of crude; at least 0.00001 grams of alkali metal salts of one or more organic acids; and at least 0.005 grams of sulfur. In one embodiment, the heavy oil feedstock has a sulfur content of at least 5 wt. % and an API gravity of from −5 to +5. A heavy oil feed comprises Athabasca bitumen (Canada) typically has at least 50% by volume vacuum reside. A Boscan (Venezuela) heavy oil feed may contain at least 64% by volume vacuum residue.

As used herein, the term "spent catalyst" or "used catalyst" refers to a catalyst that has been used in a hydroprocessing operation and whose activity has thereby been diminished, remain unchanged or has been enhanced. For example, if a reaction rate constant of a fresh catalyst at a specific temperature is assumed to be 100%, the reaction rate constant for a spent catalyst temperature is 80% or less in one embodiment, and 50% or less in another embodiment. In one embodiment, the metal components of the spent catalyst comprise at least one of Group VB, VIB, and VIII metals, e.g., vanadium, molybdenum, tungsten, nickel, and cobalt. The most commonly encountered metal is molybdenum. In one embodiment, the metals in a spent catalyst are sulfides of Mo, Ni, and V.

The terms "treatment," "treated," "upgrade", "upgrading" and "upgraded", when used in conjunction with a heavy oil feedstock, describes a heavy oil feedstock that is or has been subjected to hydroprocessing, or a resulting material or crude product, having a reduction in the molecular weight of the heavy oil feedstock, a reduction in the boiling point range of the feedstock, a reduction in the concentration of asphaltenes, a reduction in the concentration of hydrocarbon free radicals, and/or a reduction in the quantity of impurities, such as sulfur, nitrogen, oxygen, halides, and metals.

In one embodiment, the invention relates to an integrated facility (or system) comprising: 1) a heavy oil upgrade process (or zone), wherein a heavy oil feed is converted to lighter products; 2) a deoiling process or zone, wherein residual heavy oil and heavier product oils are separated from the spent slurry catalyst for subsequent recovery; 3) a metal recovery zone, wherein metals are recovered from the spent catalyst; and 4) a catalyst synthesis zone, wherein catalysts are synthesized from metals from sources including metals recovered from the spent catalyst. Any of the zone can be operated in either batch mode, continuous mode, or combinations thereof.

In one embodiment of the invention with the recovery/separation of spent catalyst from heavy oil, the heavy oil conversion rate can be up to 100%. In one embodiment, an integrated system with a deoiling zone for recovery/separation of spent catalyst allows for up at least 99% heavy oil conversion rate. In another embodiment, the overall heavy oil conversion rate is at least 99.5%. As used herein, conversion rate refers to the conversion of heavy oil feedstock to less than 1000° F. (538° C.) boiling point materials.

Heavy Oil Upgrading. The upgrade or treatment of heavy oil feeds is generally referred herein as "hydroprocessing." Hydroprocessing is meant any process that is carried out in the presence of hydrogen, including, but not limited to, hydroconversion, hydrocracking, hydrogenation, hydrotreating, hydrodesulfurization, hydrodenitrogenation, hydrodemetallation, hydrodearomatization, hydroisomerization, hydrodewaxing and hydrocracking including selective hydrocracking. The products of hydroprocessing may show improved viscosities, viscosity indices, saturates content, low temperature properties, volatilities and depolarization, etc.

Heavy oil upgrade is utilized to convert heavy oils or bitumens into commercially valuable lighter products, e.g., lower boiling hydrocarbons, in one embodiment include liquefied petroleum gas (LPG), gasoline, jet, diesel, vacuum gas oil (VGO), and fuel oils.

In the heavy oil upgrade process, a heavy oil feed is treated or upgraded by contact with a slurry catalyst feed in the presence of hydrogen and converted to lighter products, generating: a) an effluent stream containing a mixture of the upgraded products, the slurry catalyst, the hydrogen containing gas, and unconverted heavy oil feedstock, which effluent stream is subsequently passed on to a separation zone; and b) a stream defined herein as unconverted slurry bleed oil stream ("USBO"), comprising spent finely divided unsupported catalyst, carbon fines, and metal fines in unconverted resid hydrocarbon oil and heavier hydrocracked liquid products (collectively, "heavy oil") as slurry catalyst. The solids content in the USBO stream can be in the range of about 5-50 weight % in one embodiment. In a second embodiment, 10-30 weight %. In a third embodiment, about 15-25 weight %. In a fourth embodiment, the solid catalyst concentration is as low as 2 wt. %. In one embodiment, the upgrade process comprises a plurality of reactors or contacting zones, with the reactors being the same or different in configurations. Examples of reactors that can be used herein include stacked bed reactors, fixed bed reactors, ebullating bed reactors, continuous stirred tank reactors, fluidized bed reactors, spray reactors, liquid/liquid contactors, slurry reactors, slurry bubble column reactors, liquid recirculation reactors, and combinations thereof.

In one embodiment, at least one of the contacting zones further comprises an in-line hydrotreater, capable of removing over 70% of the sulfur, over 90% of nitrogen, and over 90% of the heteroatoms in the crude product being processed. In one embodiment, the upgraded heavy oil feed from the contacting zone is either fed directly into, or subjected to one or more intermediate processes and then fed directly into the separation zone, e.g., a flash drum or a high pressure separator, wherein gases and volatile liquids are separated from the non-volatile fraction, e.g., the unconverted slurry bleed oil stream ("USBO").

In one embodiment, at least 90 wt % of heavy oil feed is converted to lighter products in the upgrade system. In a second embodiment, at least 95% of heavy oil feed is converted to lighter products. In a third embodiment, the conversion rate is at least 98%. In a fourth embodiment, the conversion rate is at least 99.5%. In a fifth embodiment, the conversion rate is at least 80%.

In one embodiment, the heavy oil upgrade process employs a slurry catalyst. The catalyst slurry can be concentrated prior to heavy oil upgrading, for example, to aid in the transport of catalyst (slurry) to the heavy oil upgrading location. Effluent streams from the reactor, perhaps following downstream processing, such as, for example, separation(s), can include one or more valuable light products as well as a stream containing spent slurry/unsupported catalyst in heavy oil comprising unconverted feed.

Catalyst Synthesis: In one embodiment, the spent slurry catalyst to be separated from heavy oil originates from a dispersed (bulk or unsupported) Group VIB metal sulfide catalyst promoted with at least one of: a Group VB metal such as V, Nb; a Group VIII metal such as Ni, Co; a Group VIIIB metal such as Fe; a Group IVB metal such as Ti; a Group IIB metal such as Zn, and combinations thereof. Promoters are typically added to a catalyst formulation to improve selected properties of the catalyst or to modify the catalyst activity and/or selectivity. In another embodiment, the slurry catalyst originates from a dispersed (bulk or unsupported) Group VIB metal sulfide catalyst promoted with a Group VIII metal for hydrocarbon oil hydroprocessing.

In one embodiment, the slurry catalyst originates from a multi-metallic catalyst comprising at least a Group VIB metal and optionally, at least a Group VIII metal (as a promoter), wherein the metals may be in elemental form or in the form of a compound of the metal. The metals for use in making the catalyst can be metals recovered from a downstream metal recovery unit, wherein metals such as molybdenum, nickel, etc., are recovered from the deoiled spent slurry catalyst for use in the synthesis of fresh/new slurry catalyst.

In one embodiment, the slurry catalyst originates from a catalyst prepared from a mono-, di, or polynuclear molybdenum oxysulfide dithiocarbamate complex. In a second embodiment, the catalyst is prepared from a molybdenum oxysulfide dithiocarbamate complex. In one embodiment, the slurry catalyst originates from a catalyst prepared from catalyst precursor compositions including organometallic complexes or compounds, e.g., oil soluble compounds or complexes of transition metals and organic acids. Examples of such compounds include naphthenates, pentanedionates, octoates, and acetates of Group VIB and Group VII metals such as Mo, Co, W, etc. such as molybdenum naphthanate, vanadium naphthanate, vanadium octoate, molybdenum hexacarbonyl, and vanadium hexacarbonyl.

In one embodiment, the catalyst slurry comprising catalyst particles (or particles) having an average particle size of at least 1 micron in a hydrocarbon oil diluent. In another embodiment, the catalyst slurry comprises catalyst particles having an average particle size in the range of 1-20 microns. In a third embodiment, the catalyst particles have an average particle size in the range of 2-10 microns. In one embodiment, the slurry catalyst comprises a catalyst having an average particle size ranging from nanometer size to about 1-2 microns. In another embodiment, the slurry catalyst comprises a catalyst having molecules and/or extremely small particles (i.e., less than 100 nm, less than about 10 nm, less than about 5 nm, and less than about 1 nm), forming particles or aggregates having an average size ranging from 1 to 10 microns in one embodiment, 1 to 20 microns in another embodiment, and less than 10 microns in yet a third embodiment. In one embodiment, the catalyst particles are colloidal in size.

Deoiling Zone. The system to extract/recover/separate heavy oil from the slurry catalyst and/or concentrate a catalyst slurry is called a deoiling zone (or unit). In one embodiment of a deoiling zone, heavy oil is extracted or separated from catalyst particles, forming clean, dried solids, for subsequent recovery in the metal recovery zone. In one embodiment, the deoiling zone comprises a number of separate sub-units including solvent wash (solvent extraction), filtration, drying, and solvent recovery sub-units.

In one embodiment, the deoiling zone is used to concentrate a catalyst slurry to a solids contents of, for example, about 60-70 weight %. Due, in part, to the concentrated catalyst slurry having a reduced volume as compared to the volume of the catalyst slurry prior to concentration, the concentrated catalyst slurry can then be more easily transported to a heavy oil upgrading site or reactor, where it can be reconstituted to a solids contents of, for example, about 5 weight %, prior to heavy oil upgrading.

The term "spent catalyst slurry" refers to a catalyst slurry, whether a spent catalyst slurry to be separated from heavy oil, or a fresh catalyst slurry that needs to be concentrated.

The term "extract" may be used interchangeably with "separate" or "recover" (or grammatical variations thereof), denoting the separation of heavy oil from catalyst particles (or particles).

In one embodiment, the feed stream to the deoiling zone is a catalyst bleed stream from a heavy oil upgrade or vacuum resid unit, e.g., unconverted slurry bleed oil ("USBO") stream, comprising spent finely divided unsupported catalyst, carbon fines, and metal fines in unconverted resid hydrocarbon oil and heavier hydrocracked liquid products (collectively, "heavy oil"). In one embodiment, the USBO feed stream to the deoiling process has a spent catalyst concentration (as solids) ranging from 5-50 weight %. In another embodiment, the spent catalyst solid ranges from 10 to 20 wt. % of the total USBO feed stream. In yet another embodiment, the solid catalyst concentration is as low as 2 wt. %. The clean dried solids leaving the deoiling process consists essentially of spent catalyst solids, in one embodiment having less than 1 wt. % oil, on a solvent free basis, with less than 500 ppm of solvent.

In one embodiment, the feedstock stream is first combined with solvent to form a combined slurry-solvent stream prior to being filtered via membrane filtration. In another embodiment, the feedstock stream and the solvent are fed to the filter as separate feed streams wherein they are combined in the filtration process. In one embodiment, fresh solvent is used for the solvent wash. In another embodiment, recycled solvent from another part of the process is used. In yet a third embodiment, a mixture of fresh solvent and recycled solvent is employed. In a fourth embodiment, fresh solvent and recycled solvent are employed as separate streams. The feedstock and solvent streams can be combined prior to the deoiling zone or in the deoiling zone.

Via membrane filtration, spent catalyst is separated from the heavy oil, i.e., "deoiled," in solvent as a separate stream. A second stream is produced comprising the heavy oil and solvent. Solvent can be subsequently separated from the catalyst using processes including evaporation to dryness. Solvent can also be recovered from the stream comprising the heavy oil and solvent for subsequent reuse, with the recovered heavy oil being a product.

In one embodiment, in addition to or in place of membrane filtration, other separation techniques can be employed including inclined plate settlers, conventional settling tanks, inclined settlers with vibratory separation device, as long as the vibration is not transmitted to the settler/sedimentation unit.

Membrane Filtration: In one embodiment, a membrane filtration assembly, e.g., microfiltration, is employed in the deoiling zone to separate the heavy oil from the catalyst. In the filtration assembly, a feed stream comprising slurry catalyst in heavy oil is transformed into two streams, a first stream containing primarily hydrocarbons, e.g., a mixture of heavy oil and solvent, and a second stream containing catalyst solids with reduced heavy oil concentration in solvent. As used in the context of the deoiling zone/membrane filtration, "heavy oil" will refer to unconverted resid hydrocarbon oil, heavier hydrocracked liquid products, and mixtures thereof.

The membranes employed can be of the "tortuous-pore" or "capillary-pore" type, or a combination of multiple membrane layers, some tortuous-pore membranes some capillary-pore membranes. As used herein, tortuous-pore refers to membranes having a structure resembles a sponge with a network of interconnecting tortuous pores. Capillary-pore refers to membranes having approximately straight-through cylindrical capillaries.

Any suitable filtration medium (membrane) can be utilized in the filtration assembly. In one embodiment, the filtration medium is a porous material which permits heavy oil below a certain size to flow through as the filtrate (or permeate) while retaining the spent catalyst particles in the retentate. In one embodiment, the filter medium is of sufficient pore size for removing at least 50% of the heavy oil from the spent catalyst, i.e., for at least 50% of the heavy oil to pass through the filter membrane. In another embodiment, the filter membrane is of sufficient pore size for at least 60% of the heavy oil to pass through the membrane. In a third embodiment, the membrane is of sufficient pore size for at least 70% of the heavy oil to pass through the membrane. In a fourth embodiment, it is of sufficient size for at least 75% of the heavy oil to pass through the membrane.

In one embodiment, the filtration medium is a filtration membrane having an effective pore rating ("average pore size") of about 5 microns or less is used; for example, about 0.1-0.3 μm, about 0.05-0.15 μm, or about 0.1 μm. In a third embodiment, an effective pore rating of about 1 micron or less. In a fourth embodiment, about 0.5 micron or less. In yet a fifth embodiment, the membrane has an effective pore rating of at least 0.01 micron. In a sixth embodiment, from 0.1 to 1 micron. In a seventh embodiment, an effective pore rating of at least 1 micron. In an eight embodiment, an effective pore rating of less than 10 microns.

Polymers, organic materials, inorganic ceramic materials, and metals are suitable for use as construction materials for the membrane, as long as they are solvent stable. The term "solvent-stable" refers to a material that does not undergo significant chemical changes to substantially impair the desired properties of the material. Stability can be verified by various well-known techniques, which include, but are not limited to, soaking test, scanning electron microscopy (SEM), X-ray diffraction (XRD), differential scanning calorimetry (DSC) and thermogravimetric analysis (TGA).

In one embodiment, the filtration membrane is made of polytetrafluoroethylene (Teflon®), for example, polytetrafluoroethylene on woven fiberglass, which can withstand temperatures of 130° C. (266° F.). With the use of polytetrafluoroethylene, the membrane is chemically inert, can handle continuous pH levels of 0-14.

In one embodiment, the filtration membrane comprises a polymeric material selected from the group of poly(acrylic acids), poly(acrylates), polyacetylenes, poly(vinyl acetates), polyacrylonitriles, polyamines, polyamides, polysulfonamides, polyethers, polyurethanes, polyimides, polyvinyl alcohols, polyesters, cellulose, cellulose esters, cellulose ethers, chitosan, chitin, elastomeric polymers, halogenated polymers, fluoroelastomers, polyvinyl halides, polyphosphazenes, polybenzimidazoles, poly(trimethylsilylpropyne), polysiloxanes, poly(dimethyl siloxanes), and copolymers blends thereof. These polymers can be physically or chemically cross-linked to further improve their solvent stability.

In one embodiment, the membrane comprises an inorganic material such as ceramics (silicumcarbide, zironiumoxide, titaniumoxide, etc.) having the ability to withstand high temperatures and harsh environments. In one embodiment, the membrane is constructed from a woven fabric coated with a nanomaterial, e.g., an inorganic metal oxide, allowing the membrane to be in the form of a flexible ceramic membrane foil with advantages of both ceramic and polymeric membranes. In another embodiment, the filtration membrane is constructed from a metal such as stainless steel, titanium, bronze, aluminum or nickel-copper alloy. In yet another embodiment, the membrane is constructed from materials such as sintered stainless steel with an inorganic metal oxide coating, e.g., a titanium oxide coating.

In one embodiment, the deoiling zone comprises a membrane that is rapidly displaced in a horizontal direction. A retentate of the membrane comprises the fine catalyst and a permeate of the membrane comprises the heavy oil. In particular, rapidly displacing the membrane in a horizontal direction can comprise rotating the membrane.

In one embodiment, filtration membrane operating pressure is in the range of about 30-100 psi (about 2-7 bar). Filtering can be conducted at a temperature of about 50-200° C. and a pressure of about 80-200 psi, for example at a temperature of about 100° C. and a pressure of about 90 psi. In one embodiment, the deoiling zone comprising multiple filtration units is operated at a pressure in the range of about 20-400 psi, for example, about 30-300 psi or about 50-200 psi. Pressure drops across the membrane in the filtration units, referred to as the transmembrane pressure, are in the range of about 0-100 psi, for example, about 0-50 psi or about 0-25 psi. In one embodiment, the temperature of the deoiling zone is in the range of about 100-500° F., for example, about 150-450° F. or about 200-400° F.

Solvent Extraction/Addition: In the deoiling zone, an extracting medium is employed for the extraction/separation of the heavy oil from the spent catalyst. Solvent addition to an oil/catalyst slurry or an oil rich solvent/oil/catalyst slurry is also used herein to reduce the effective viscosity and density of the continuous liquid phase containing the suspended catalyst particles, thereby enhancing the settling of the particles and subsequent separation of the slurry into two phases. In one embodiment, the extraction medium is a composition comprising a light specific gravity solvent or solvent mixtures, such as, for example, xylene, benzene, toluene, kerosene, reformate (light aromatics), light naphtha, heavy naphtha, light cycle oil (LCO), medium cycle oil (MCO), propane, diesel boiling range material, which is used to "wash" the feed stream to the deoiling zone. In one embodiment, the solvent is a commercially available solvent such as ShelSol™ 100 series solvent.

In one embodiment, the washing/mixing with solvent (i.e., solvent extraction) is done prior to membrane filtration, e.g., in a separate tank such as a settling tank/mixing tank prior to the membrane filtration unit. In another embodiment, the washing/mixing with solvent is in-situ in a membrane filtration unit. In one embodiment, a light specific gravity solvent and feed stream comprising spent slurry catalyst are supplied in separate stream to one or more filtration units in a countercurrent fashion. In yet another embodiment, the washing/mixing with solvent is in a concurrent fashion.

In one embodiment, the solvent can be a recycled solvent (used solvent) recovered from a process step within the deoiling zone. In another embodiment a solvent mixture containing at least any two of all the aforementioned solvents is used.

In one embodiment, the feedstock stream containing slurry catalyst, i.e., catalyst particles in heavy oil, is mixed/washed with solvent in a volume ratio of ranging from 0.10/1 to 100/1 (based on the spent catalyst slurry volume). In a second embodiment, the solvent is added in a volume ratio of 0.50/1 to 50/1. In a third embodiment, at a volume ratio of 1/1 to 25/1.

In one embodiment, the feedstock stream containing slurry catalyst, is mixed/washed with a sufficient amount of solvent to reduce the heavy oil concentration in the feedstock stream by at least 40%. In a second embodiment, a sufficient amount of solvent is added to reduce the heavy oil concentration by at least 50%. In a third embodiment, the heavy oil concentration is reduced by at least 60%.

In one embodiment with 50 to 90 wt % heavy oil in the feedstock stream comprising catalyst particles and heavy oil and wherein the heavy oil is essentially in a colloidal suspension, a sufficient amount of solvent is added to break up the colloidal suspension of the heavy oil and reduce the effective viscosity and density of the continuous liquid phase (that is, the oil/solvent mixture), thereby causing the catalyst particles suspended in the oil/solvent mixture to separate into two phases faster. In one embodiment, the sufficient amount of solvent added ranges from 0.50/1 to 50/1 (volume ratio of solvent to mixture of catalyst particles in heavy oil). In a second embodiment, at a volume ratio of 1/1 to 25/1.

In one embodiment with 50 to 90 wt % heavy oil in the feedstock stream comprising catalyst particles and heavy oil and wherein it takes a fairly substantial amount of time for the particulates, i.e., the slurry catalyst in slurry oil, to settle, a sufficient amount of solvent is added to increase the settling/sedimentation rate of the particulates by at least 25%. In another embodiment, by at least two folds. In yet another embodiment, by at least a factor of 1.25. In one embodiment, the addition of the solvent will cut down the amount of time for the particulates to settle by half. In another embodiment, the added solvent increases the sedimentation rate at least three folds.

In one embodiment, in addition to or instead of the solvent addition, the feedstock stream containing catalyst particles in heavy oil (and optionally with solvent) is heated to a sufficiently high temperature to decrease the density and viscosity of the catalyst/heavy oil mixture, thereby enhancing the settling of the particulates. In one embodiment, the mixture is heated to a temperature of up to the saturation temperature of the solvent at the corresponding operating pressure. In one embodiment, the maximum operating pressure is 500 psig.

The addition of solvent to an oil/catalyst feed slurry (or an oil rich solvent/oil/catalyst slurry) reduces the effective viscosity and density of the continuous liquid phase containing the suspended catalyst particles, thereby enhancing the settling of the particles and subsequent separation of the slurry into two phases: a bottom phase comprising catalyst particles, solvent, and a heavy oil concentration that is less than the initial heavy oil concentration in the feed stream; and the top phase comprising heavy oil in solvent and virtually solids free. The two phases can be subsequently gravity separated with the use of a settling tank.

It is noted that catalyst particles settle significantly faster to the bottom (i.e., as in a two phase mixture) with the reduction of the heavy oil concentration. Thus in one embodiment, the washing/mixing with solvent is carried out with the use of at least one separator such as a settling tank to allow for the settling of the catalyst particles at the bottom, and successive removal of the lighter phase comprising solvent and portions of the heavy oil from the separator until most of heavy oil is removed from the catalyst particles, leaving a stream consisting mostly of catalyst solids in light specific gravity solvent. The use of solvent in combination of a separator to remove some of the heavy oil from the catalyst particles is herein after referred to as "solvent separation."

In one embodiment, the washing/mixing and subsequent phase separation steps take place in a settling tank. In another embodiment, the washing/mixing/phase separation steps are repeated at least once in settling tank(s). In a third embodiment, settling tank(s) are used in combination with filtration units, e.g., cross-flow filtration, cross-flow sedimentation, etc. for most of the heavy oil to be phase-separated from catalyst particles first using settling tanks, then for the residual heavy oil to be separated with filtration technology. In a fourth embodiment, filtration technology is used for initial solvent addition and oil removal, and settling tank(s) is used for the removal of the residual oil from the solvent-rich catalyst slurry. Yet in another embodiment, the separation is effected by at least one unit of combined settler/filter assembly.

In one embodiment, instead of or in addition to the use of settling tanks for the separation of the light and heavy phases, other separation means known in the art can be employed, including but not limited to centrifugal force enhanced settling devices such as centrifuges, filtering centrifuges, and cyclonic separators. In another embodiment, an inclined plate settler such as Lamella® Gravity Settler is used. In yet another embodiment, the separation is enhanced with the use of electrical coulomb forces, electrical currents, and/or magnetic forces as a magnetic field, or a series of magnetic fields. It should be noted that enhanced separation means can be used with the settling tanks, centrifugal force enhanced settling devices as well as with the membrane filtration system, e.g., dialfiltration, cross-flow filtration, dynamic filtration, etc.

In one embodiment, the mixture of catalyst particles in heavy oil emulsion and/or solvent is subject to an electric field to enhance the effectiveness of the separation. In yet another embodiment, the mixture of catalyst particles in solvent and/or heavy oil emulsion is exposed to a magnetic field to enhance the migration of the catalyst particles away from the heavy oil, providing a phase with reduced heavy oil concentration.

In one embodiment, the additional solvent is rendered magnetic by mixing a particulate magnetic material therewith prior to or concurrent with the addition of the feedstock stream containing slurry catalyst. As used herein, the term "magnetic material" means a material having ferromagnetic or strong paramagnetic properties. Suitable magnetic materials include magnetite, ferrites, hematite, magnetite, pyrrhotite and metals, alloys and compounds containing iron, nickel or cobalt. In one embodiment, the magnetic material is magnetite. The magnetic material may be derived from various sources. In one embodiment, the magnetic materials are first rendered hydrophobic prior to mixing with the solvent by coating the surfaces with a polar surfactant which adsorbs onto the particle surfaces, e.g., compounds with functional groups having anionic, cationic or amphoteric properties. While in a separator like a settling tank, the mixture comprising the solvent, catalyst particles and heavy oil is subjected to a magnetic field which accelerates phase separation because of the magnetic nature imparted by the magnetic organic solvent.

The number of separators such as settling tanks and the order of the separators relative to the filtration assembly can be arranged to optimize the separation of the heavy oil from the catalyst particulates. With solvent separation, an initial heavy oil concentration of up to 90 wt. % in a feed stream comprising a catalyst slurry to less than 50 wt. % in one embodiment, less than 30 wt. % in a second embodiment, less than 10 wt. % in a third embodiment, less than 5 wt. % in a fourth embodiment, and less than 2 wt. % in a fourth embodiment. The composition with reduced heavy oil concentration can be routed to a filtration assembly for further separation.

It should be noted that the operation of any of the solvent separation means and or filtering units, e.g., settling tanks, centrifugal force enhanced settling devices, inclined settlers, dialfiltration units, cross-flow filtration units, dynamic filtration units, filtration sedimentation units, can be in any of a batch mode, a continuous mode, semi-batch mode, semi-continuous mode, or combinations thereof. Furthermore, the addition of the solvent to the feed stream or any of the filtration unit can be carried out intermittently, progressively, abruptly, sequentially, or combinations thereof.

In one embodiment after a sufficient amount of solvent is added to reduce the heavy oil concentration of at least 50%, the stream comprising solvent, catalyst particles and heavy oil is put into a settling tank to allow separation by gravity. In one embodiment after successive separation steps with a plurality of settling tanks, at least 90% of the heavy oil is removed from the catalyst particles.

In one embodiment, the mixing of solvent and feedstock is for a sufficient amount of time and at a temperature sufficient to prevent substantial asphaltenes precipitation prior to and during filtration. In one embodiment, this temperature ranges from about 50 to 150° C. In one embodiment, the mixing is in the range from 15 minutes to an hour. In another embodiment, for at least 20 minutes. In another embodiment in a continuous process, the mixing of solvent and feedstock is less than 10 minutes. In yet another embodiment with the mixing of solvent and feedstock being in-situ in a filtering device, the mixing occurs in 5 minutes or less.

Besides combining/washing the feedstock containing slurry catalyst in heavy oil with solvent prior to filtering, the retentate of the membrane from the filtering process can also be washed with a solvent. After washing in a filtration unit, a permeate (filtrate) stream comprising heavy oil and solvent, can be recovered in addition to a retentate stream, comprising unsupported fine catalyst and solvent. The unsupported fine catalyst can be subsequently separated from the retentate stream of the membrane.

In one embodiment, the solvent of the combined retentate-solvent stream is a different solvent than the solvent of the combined slurry-solvent stream. In another embodiment, the solvent for use in the combined retentate-solvent can be the same solvent as the solvent of the combined feedstock-solvent stream. In yet another embodiment, the solvent can include solvent from a different source than the solvent of the combined feedstock-solvent stream. In another embodiment, solvent-rich permeate from at least one of the filter units can be the source of at least a portion of the solvent for the combined slurry-solvent stream and/or the combined retentate-solvent stream.

In one embodiment, the retentate stream from a first filtration unit can be combined with solvent prior to a next filtration unit in series, through which the combined retentate-solvent stream is filtered. In one embodiment, a permeate (filtrate) stream of a later-staged filtration unit (in a system with a plurality of filtration stages or units) can be recycled to be used as the solvent for use with the feed stream entering an earlier staged filtration unit, forming a combined feedstock-solvent stream.

In one embodiment, the retentate stream is further diluted with a solvent rich stream and passed to a succeeding filtration unit. In one embodiment, the solvent rich stream is a stream of unconverted oil along with a solvent such as toluene, which is passed through the membrane of a succeeding filtration unit. As the retentate streams move forward to succeeding filtration units, the retentate streams can be sequentially washed counter-currently with toluene rich streams passed through the membranes of succeeding filtration units.

In one embodiment, the retentate streams are sequentially washed in a "counter-current" fashion, in that retentate streams pass from one filtration unit to the next (e.g., five to six total stages), while the solvent that is added to the retentate streams comes from one more downstream filtration units. For example, in an embodiment, the solvent cascades from the last filtration unit to the first filtration unit, counter to the flow of the retentate streams passing through the filtration units. In this way, the liquid portion of the feed to the first filtration unit comprises a mixture of solvent and unconverted oil, while the liquid portion of the feed to the last filtration unit comprises substantially pure solvent, and the retentate stream of the last filtration unit comprises the catalyst particles in substantially pure solvent.

As illustrated in FIGS. 1A-1F, the filtration membranes employed can be fabricated into various forms including a pressure leaf unit (either horizontal or vertical type), a plate and frame unit (FIG. 1A), pleated membrane (FIG. 1B), a tubular/hollow module (1C), a plurality of tubular/hollow modules (FIG. 1D), a spiral wound form (1E), or combinations thereof, e.g., a plurality of tubular modules with each being of spiral wound form (not shown).

Figure 1A:
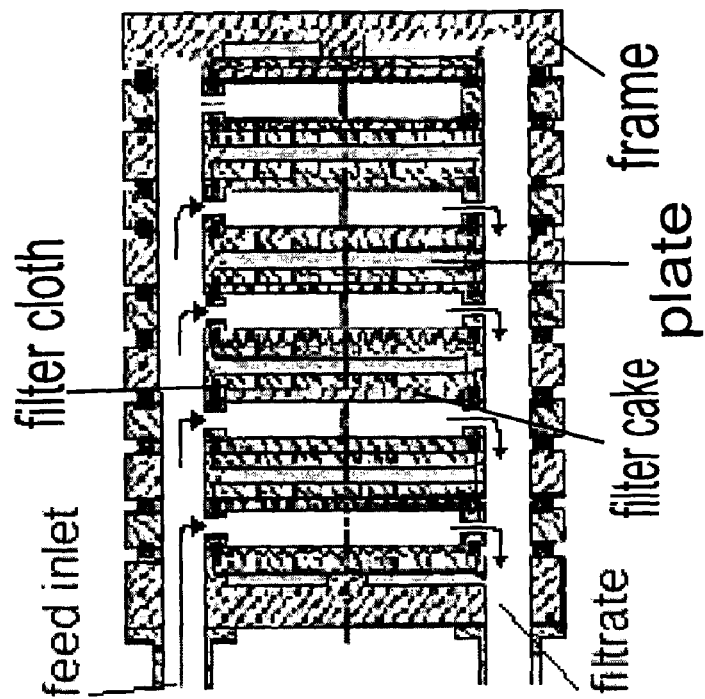
FIG. 1A is a cross-sectional view of a plate and frame filtration unit.

FIG. 1A is a cross-section view of a plate and frame (flat plate) unit. In one embodiment, the plate and frame (flat plate) unit can take sheet stock filtration membranes.

In FIG. 1B, a pleated filtration membrane is interposed between two permeable sheets and is wound on a core having a plurality of collection ports. An outer guard is provided to protect the filtration membrane. The system is sealed by end plates at opposite ends of the filer. Heavy oil is collected from the collection ports and comes out of the outlet. In one embodiment of the pleated membrane of FIG. 1B, a sleeve is placed around the cartridge and the housing so as to withdraw the retentate stream from the bottom of the housing, the cross-flow stream being thereby forced into the pleats where it moves tangential to the membrane.

Figure 1D:
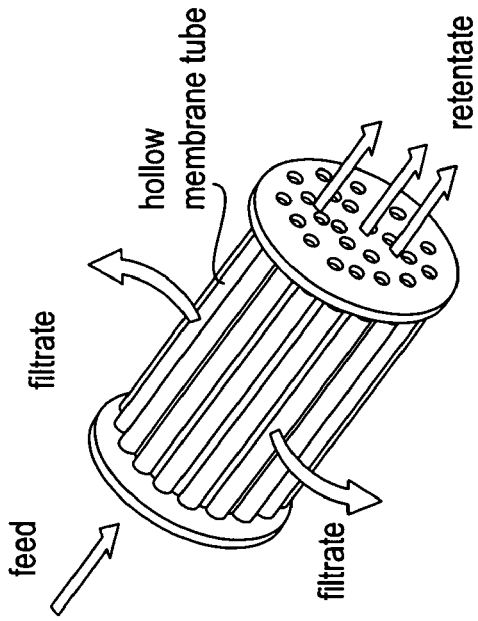
FIG. 1D is a perspective view of a membrane system having a plurality of tubular/hollow membrane filters.
Figure 1C:
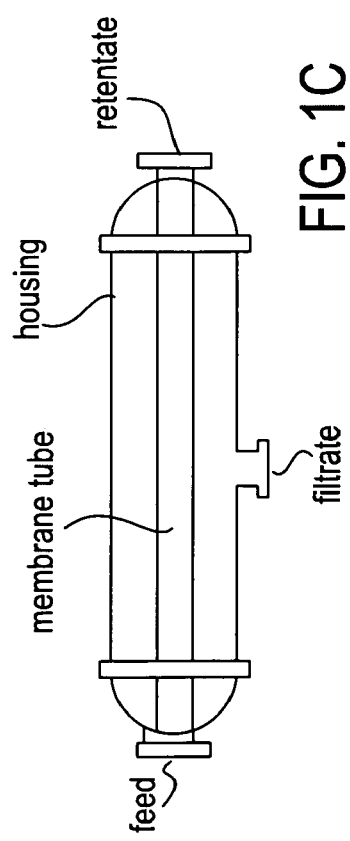
FIG. 1C is a schematic diagram of a membrane filtration system with a tubular membrane filter.

FIG. 1C illustrates a substantially tubular membrane filter having an outer housing, an inlet (feed), a retentate outlet and a permeate outlet (filtrate). Extending within the housing is at least a tubular filter which is parallel to the axis of the housing.

FIG. 1D is a second embodiment a tubular filter system with a plurality of filter sleeves (hollow membrane tubes) running parallel to one another and to the axis of the housing.

Figure 1E:
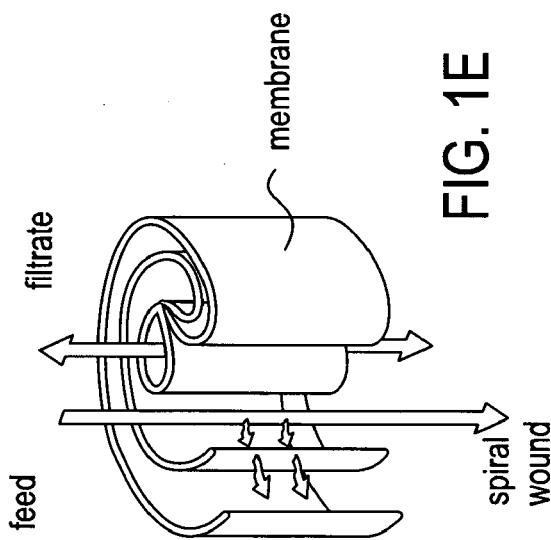
FIG. 1E is a perspective view of a membrane system in a spiral wound form.

FIG. 1E illustrates a spiral wound membrane module with alternating layers of membrane and separator screen being wound around a hollow central core. In operation, the feed stream is pumped into one end of the cartridge. The filtrate passes through the membrane and spirals to the core of module, where it is collected for removal.

In one embodiment, the filtration assembly in the deoiling zone comprises a plurality of filtration units for effective removal of heavy oil from catalyst particles. In one embodiment, a filtration assembly with a plurality of filtration units is capable of removing most of the heavy oil from catalyst particles, for a filtrate stream comprising solvent and at least 50% of the incoming heavy oil (in the feed stream of heavy oil and slurry catalyst). In another embodiment, a filtration assembly with a plurality of filtration units is capable for removing at least 90% of the heavy oil from the catalyst particles. In a third embodiment, at least 95% of the heavy oil is removed from the catalyst particles. In a fourth embodiment, a filtration assembly with a plurality of filtration units is capable for removing at least 99% of the heavy oil from the catalyst particles.

In one embodiment, the filtration assembly comprises between two to ten filtration units. In another embodiment, at least four to eight filtration units. In a third embodiment, the assembly comprises six filtration units. The filtration units employed in the deoiling zone can be in any of the form of diafiltration, cross-flow filtration, dynamic filtration, cross-flow sedimentation, co-current sedimentation separation, countercurrent sedimentation separation, and combinations thereof, which processes are to be described in further detail below.

In one embodiment of the membrane filtration process, each filtration unit may comprise a plurality of stages, e.g., at least two stages of cross-flow filtration, at least two stages of dial filtration, or combinations of cross-flow filtration, cross-flow sedimentation, co-current sedimentation separation, countercurrent sedimentation separation, and/or diafiltration and/or dynamic filtration, each being a separate stage. The number of stages of filtration and the solvent to heavy oil ratio are set to achieve the required deoiling efficiency.

Diafiltration. In one embodiment, the membrane filtration is in the form of diafiltration. In the prior art, diafiltration is typically used for purifying retained large molecular weight species, increasing the recovery of low molecular weight species, buffer exchange and simply changing the properties of a given solution. With the fractionation process of diafiltration and with the use of solvent, heavy oil molecules are washed through the membrane as filtrate, leaving the catalyst solids (particles) in the retentate.

In one embodiment, diafiltration is in the form of a single stage. In another embodiment, the diafiltration unit comprises a plurality of stages, e.g., at least several stages in one embodiment, between about 2 and 5 stages in a second embodiment, and at least 7 in a third embodiment. With the use of diafiltration, the fine solid in the slurry catalyst in a first solution (e.g., a heavy bleed oil or hydrocarbon solution) is transferred to in a second solution (retentate) along with a solvent such as, for example, toluene or light naphtha. Heavy bleed oil is recovered in the filtrate stream along with solvent.

Dynamic Filtration. In one embodiment, one or more filtration units described above may be replaced by one or more dynamic filtration units.

Dynamic filtration has been typically employed in treating wastewater containing particulate matters and waste oils. A dynamic filtration assembly has the ability to handle a wide range of materials, to achieve an appreciably high concentration of retained solids, to be operated continuously over extended periods without the need for filter aids and/or back-flushing, and to achieve uniformly high filter performance to minimize the overall system size. The dynamic filtration assembly may be of any suitable configuration and will typically include a housing which contains a filter unit comprising one or more filtration media and a means to effect relative movement between the filtration medium and the materials to be filtered. The filtration media of the filter unit and the means to effect relative movement between the fluid being filtered and the filtration medium may have any of a variety of suitable configurations. A variety of suitable motive means can be utilized to carry out such relative motion, such as, for example, rotational, oscillation, reciprocating, or vibratory means.

Variable vibration amplitude and corresponding shear rate, oscillation frequency, and shear intensity directly affect filtration rates. Shearing is produced by the torsion oscillation of the membrane. In one embodiment of a dynamic filtration unit, the membrane oscillates with an amplitude of about 1.9-3.2 cm peak to peak displacement at the edge of the membrane. Optimal filtration rates can be achieved at high shear rates, and, since the concentrate is not degraded by shear, maximum shear is preferred, within practical equipment limitations. In one embodiment, a dynamic filtration unit creates shear forces of at least about 20,000 $sec^{-1}$. In a second embodiment, at least about 100,000 $sec^{-1}$. In another embodiment, the oscillation frequency is about 50-60 Hz, for example, about 53 Hz, and produces a shear intensity of, for example, about 150,000 $sec^{-1}$. In yet another embodiment, a shear force between 20,000 and 100,000 $sec^{-1}$.

In one embodiment, the dynamic filtration assembly operates with relatively low cross-flow velocities, thus preventing a significant pressure drop from the inlet (high pressure) to the outlet (lower pressure) end of the device, which can lead to premature fouling of the membrane that creeps up the device until permeate rates drop to unacceptably low levels.

In one embodiment, operating pressure in a dynamic filtration assembly is created by the feed pump. While higher pressures often produce increased permeate flow rates, higher pressures also use more energy. Therefore, the operating pressure optimizes the balance between flow rates and energy consumption.

The dynamic filtration assembly may be of any suitable device. Suitable cylindrical dynamic filtration systems are described in U.S. Pat. Nos. 3,797,662, 4,066,554, 4,093,552, 4,427,552, 4,900,440, and 4,956,102. Suitable rotating disc dynamic filtration systems are described in U.S. Pat. Nos. 3,997,447 and 5,037,562, as well as in U.S. patent application Ser. No. 07/812,123. Suitable oscillating, reciprocating, or vibratory dynamic filtration assemblies are generally described in U.S. Pat. Nos. 4,872,988, 4,952,317, and 5,014,564. Other dynamic filtration devices are discussed in Murkes, "Fundamentals of Crossflow Filtration," Separation and Purification Methods, 19(1), 1-29 (1990). In addition, many dynamic filtration assemblies are commercially available. For example, suitable dynamic filtration assemblies include Pall BDF-LAB, ASEA Brown Bovery rotary CROT filter, and New Logic V-SEP.

In one embodiment, the dynamic filtration unit employed is exemplified by a Vibratory Shear Enhanced Processing (V*SEP) system from New Logic. In a V*SEP system, a membrane module is used for separation, and wherein intense shear waves are imposed on the face of the membrane. V*SEP systems have been typically employed in treating wastewater containing particulate matters and waste oils. In one embodiment of the invention, V*SEP is used in the deoiling process.

In one embodiment, the use of dynamic filtration allows for the same separation efficiency to be achieved with fewer filtration stages. In particular, while typical cross-flow filters are usually limited to solids contents of 25-35 weight % to avoid fouling of the membrane, dynamic filtration machines can accept higher solids contents (50-70 weight %) while maintaining performance. Accordingly, the use of dynamic filtration allows for greater oil removal per stage in diafiltration mode, which would reduce the required number of stages.

In a dynamic filtration unit, a slurry to be filtered remains nearly stationary, moving in a leisurely, meandering flow. Shear cleaning action is created by rapidly (i.e., 50-60 Hz) horizontally displacing the membrane (i.e., in directions in the same plane as the face of the membrane). In an embodiment, the displacement is rotational or oscillatory. The shear waves produced by the displacement, or vibration, of the membrane cause solids and foulants to be lifted off the membrane surface and remixed with the slurry and expose the membrane pores for maximum throughput.

In an embodiment, dynamic filtration is used to aid in the transport of catalyst (slurry) prior to heavy oil upgrading. In yet another embodiment, dynamic filtration is used to concentrate catalyst slurry to a solids contents of, for example, about 60-70 weight %. Due, in part, to the concentrated catalyst slurry having a reduced volume as compared to the volume of the catalyst slurry prior to concentration via dynamic filtration, the concentrated catalyst slurry can then be more easily transported to a heavy oil upgrading site or reactor, where it would be reconstituted to a solids contents of, for example, about 5 weight % in one embodiment, prior to heavy oil upgrading. In another embodiment, 2 wt. %. In one embodiment, a catalyst slurry is concentrated with the removal of at least 25% of the heavy oil. In another embodiment, a catalyst slurry is concentrated with a heavy oil removal of at least 50%. In a third embodiment, at least 75% of the heavy oil is removed.

Sedimentation Separation. In one embodiment, the membrane filtration is in the form of a sedimentation separator. In sedimentation separation, the membrane is in the form of a plurality of channels arranged in parallel, and wherein the channels are inclined downward to facilitate sedimentation. In one embodiment, the channels are in the form of a pleated membrane, e.g., a V-shape, a U-shape, etc. In another embodiment, the channels are in the form of tubes having elliptical, square, rectangular, or circular cross-sectional area. The term "channel" may be used interchangeably with "tube." In one embodiment, the sedimentation separator further comprises a receiving chamber (a sedimentation container) for receiving the retentate.

In one embodiment, the filter system has tube diameters or channel heights of 100 mm or less, a length of approx. 0.2 to 2.5 m and an angle of inclination at least 45° from a horizontal surface. In a second embodiment, the angle of inclination ranges from 45 to 75°. In yet another embodiment, the tubes (or channels) have a length in the range from 0.2 to 1.5 m. In a fourth embodiment, the filter system has an angle of inclination from a horizontal surface in the range of 30 to 60°.

The tubes can be of any shape or form. In one embodiment, the membrane filter is in the form of a plurality of channels having a rectangular cross section. In yet another embodiment, the membrane filter is in the form of a plurality of round tubes (circular cross-section area). In one embodiment, the tubes (or channels) have uniform cross-section areas. In another embodiment, the cross-sectional areas vary depending on the location of the tubes.

In one embodiment of a membrane sedimentation system, the apparatus comprises a module comprising the tubes (or channels), a covering plate and a return vessel (located beneath the inclined channels) for the collection of the filtrate. In one embodiment, the apparatus further comprises inflow and outflow chamber plates to improve the flow distribution. The plates can be either flat plates or shaped. In one embodiment, the plates are arranged in close proximity and perpendicular to the inflow and outflow channels.

Figure 2:
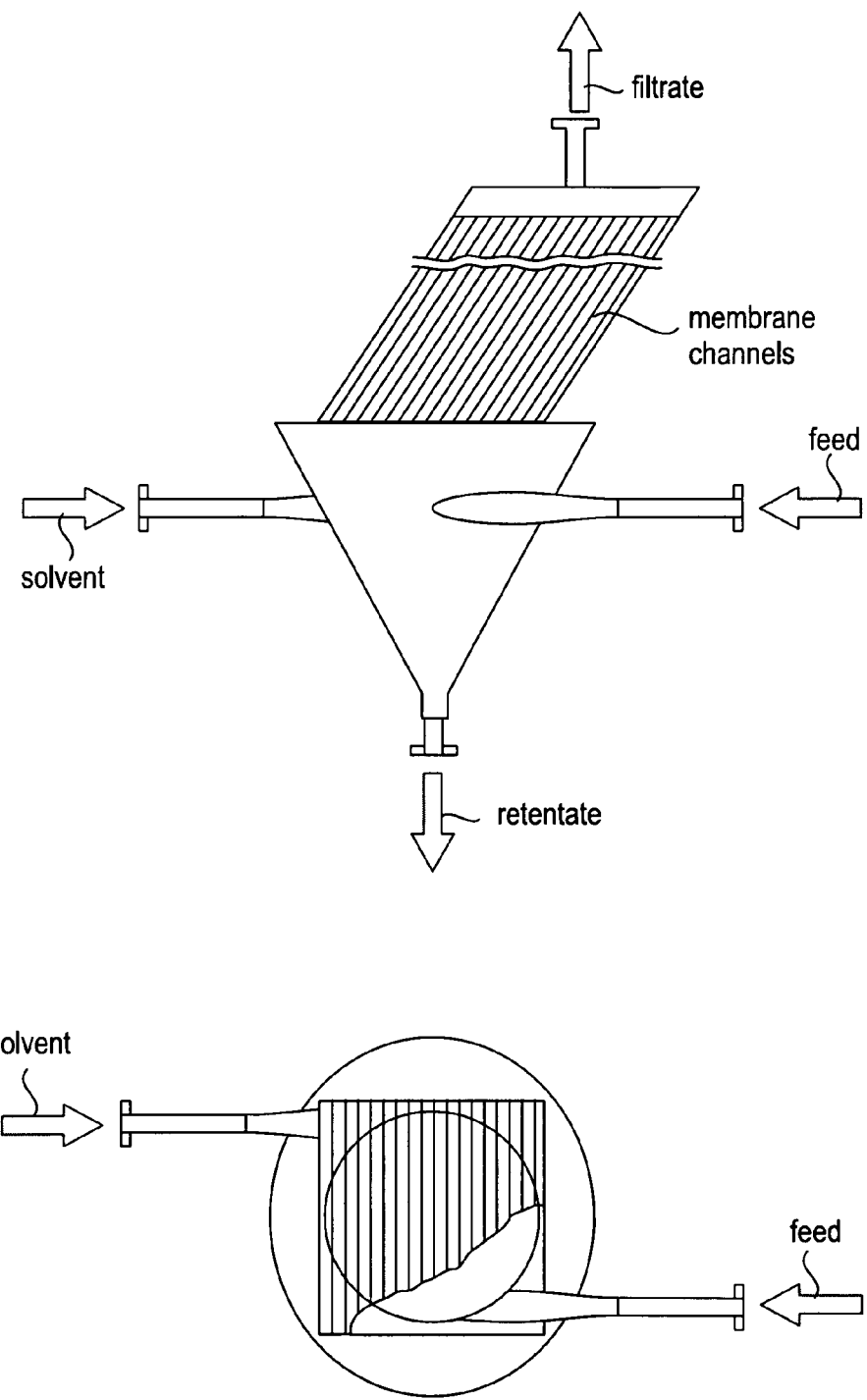
FIG. 2 is a schematic diagram of a countercurrent sedimentation separator with membrane channels arranged in parallel and two opposite (countercurrent) inflow streams into a receiving chamber.
Figure 3:
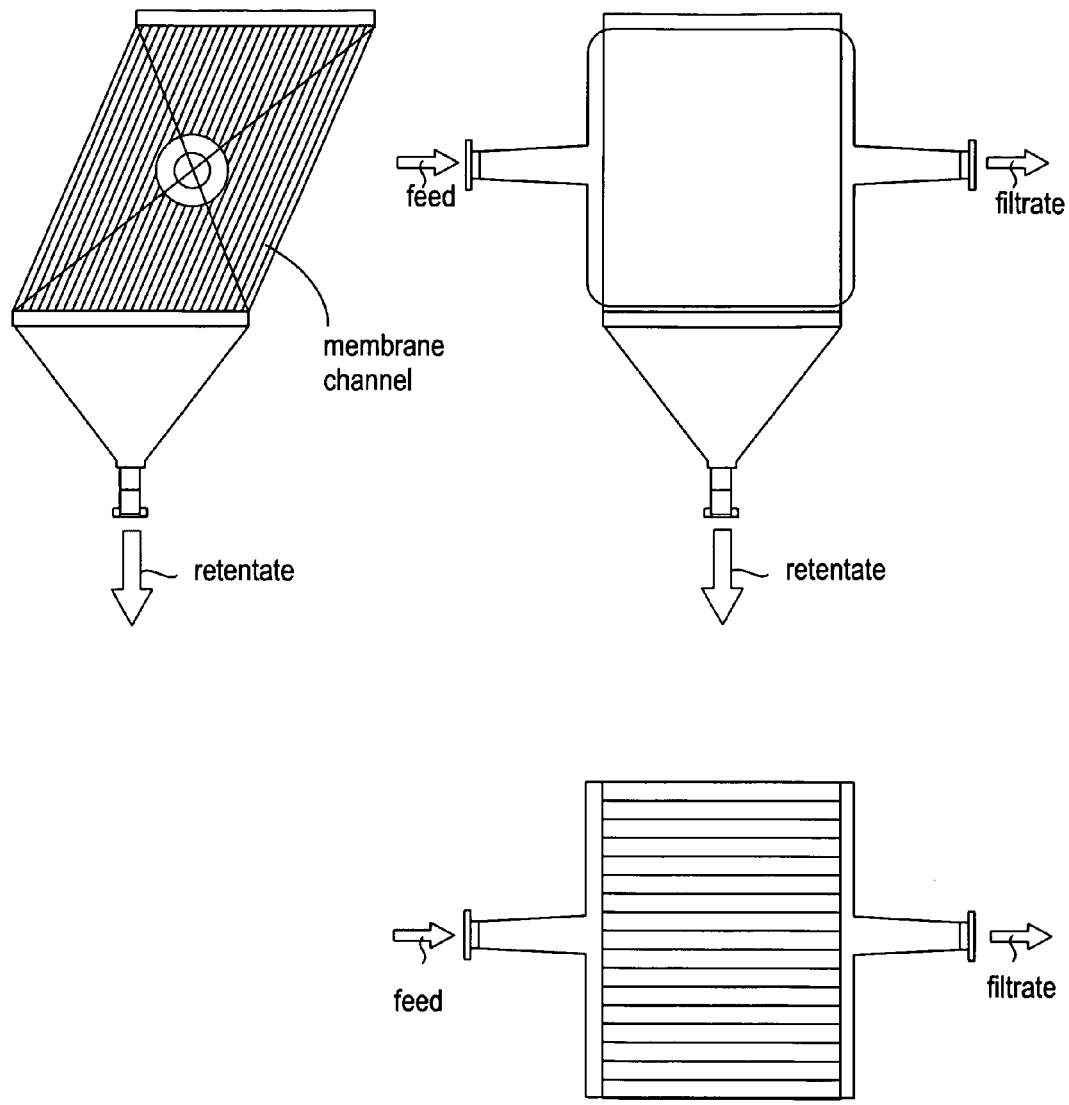
FIG. 3 is a schematic diagram of a cross-flow sedimentation separator with membrane channels arranged in parallel, with an inflow stream on one side of the channels and an outlet (filtrate) stream at the opposite side of the channels.

The membrane sedimentation separator for use in the deoiling zone can be in any of the form: counter-current sedimentation separator (as illustrated in FIG. 2), cross-flow sedimentation separator (as illustrated in FIG. 3), and co-current sedimentation separator (not shown). As shown in FIG. 2 of an embodiment of counter-current sedimentation separation, the solvent stream and feed stream comprising slurry catalyst in heavy oil are provided to the receiving chamber as two separate opposite (counter-current) flows. FIG. 3 illustrates an embodiment of a cross-flow sedimentation separator, with the inlet comprising solvent, slurry catalyst in heavy oil entering one side of channels and an outflow for the filtrate (comprising heavy oil and solvent) on the opposite side of the channel. A pyramidal receiving chamber is located beneath the channels for the collection of the retentate (comprising slurry catalyst and solvent).

In one embodiment, the membrane filtration system comprises a plurality of different or the same sedimentation separators, e.g., two cross-flow sedimentation separators in series, a dynamic filtration system in series with a counter-current sedimentation separator, or a combination of cross flow sedimentation, co-current sedimentation, conventional settling tank, inclined settler with a dynamic filtration system (a vibratory separation device), as long as the vibration from the dynamic filtration unit is not transmitted to the settler/sedimentation unit.

In one embodiment, a feed stream to the membrane filtration unit containing 60-95 wt. % heavy oil and 2-40 wt. % spent catalyst (as solids, in the form of slurry catalyst) may exit the filtration unit as a retentate stream containing 2-40 wt. % catalyst (as solids), 0.01 to 1 wt. % heavy oil, and with the remainder as solvent. In a second embodiment, the retentate stream exiting membrane filtration may contain anywhere from 0.05 to 0.5 wt. % heavy oil, on a solvent-free basis. In a third embodiment, the amount of heavy oil remaining in the retentate ranges from 0.1 to 0.3 wt. %.

In the deoiling zone, the slurry catalyst in heavy oil is solvent washed and separated in mixed stream is solvent washed in a deoiling zone and transferred from a heavy, USBO into a low boiling range solvent. The products from the deoiling zone include a stream with the catalyst and a higher percentage of solvent and a stream without catalyst and with a relatively high percentage of USBO. From the deoiling zone a stream consisting of solvent and carrier oil mixture is routed to a splitter column, which produces an overhead stream of solvent, which is recirculated to solvent tankage for use in the washing process, and a bottoms stream of carrier oil, which is sent to product recovery, a hydroprocessing section, or to another residue disposition unit.

In one embodiment after membrane filtration (e.g., filtration using any of cross-flow filtration, diafiltration, dynamic filtration, etc.), the filtrate product comprising solvent and heavy oil mixture is routed to a separator, e.g., a splitter column, for the separation and subsequent recovery of solvent and heavy oil. Solvent (and any residual heavy oil) can be subsequently separated from the catalyst particles in the retentate stream using various separation means including drying, detergent washing, ultrasonic cleaning, plasma cleaning, and the like. In one embodiment, the retentate stream comprising mostly slurry catalyst in solvent can be sent to a drying zone.

In one embodiment, the splitter column produces an overhead stream of solvent which can be rerouted to a solvent tank for re-use in the solvent washing process, and a bottoms stream of carrier oil (unconverted heavy oil and heavier hydrocracked liquid products) which can be sent to product recovery, a hydroprocessing unit, or a residue disposition unit.

Drying Zone: The retentate (bottoms) stream consisting of highly concentrated spent catalyst in solvent in one embodiment is sent to a drying zone for final devolatilization. Deoiling followed by drying allows for production of a sufficiently hydrocarbon-dry material to meet downstream metals recovery requirements.

In one embodiment, the feed stream to the drying zone comprises between 50 to 90 wt. % hydrocarbons, and the remainder being catalyst particles. Most of the hydrocarbons are in the form of solvent, and with residual heavy oil making up less than 5 wt. % of the total stream in one embodiment, less than 3 wt. % in another embodiment, and less than 0.1 wt. % in yet another embodiment.

In one embodiment, the drying step can involve, for example, evaporation at ambient conditions, warming in a dryer, or processing through a robust thin-film (or wiped-film) combination type dryer or evaporator. In another embodiment, the drying step utilizes an apparatus that would convert the catalyst to a free-flowing granular state with a minimum time of exposure to heat and vacuum, e.g., a nitrogen charged furnace. In one embodiment, the drying apparatus is selected from an indirect fired kiln, an indirect fired rotary kiln, an indirect fired dryer, an indirect fired rotary dryer, an electrically heated kiln, an electrically heated rotary kiln, a microwave heated kiln, a microwave heated rotary kiln, a vacuum dryer, a thin film dryer, a flexicoker, a fluid bed dryer, a shaft kiln dryer or any such drying device. Retentate stream from the filtration unit can be fed to the drying apparatus either co-currently or counter-currently with the gas feed, which can be oxidative, reducing, or inert gas.

In one embodiment, the drying apparatus is a thin film dryer, a thin-film evaporator, a wiped film dryer, or a wiped-film evaporator, which is efficient in rapidly exposing the surfaces of the catalyst particles to the heat transfer medium. In one embodiment, the drying apparatus is a vertical thin-film dryer, a vertical thin-film evaporator, a vertical wiped-film dryer, or a vertical wiped-film evaporator. In another embodiment, the apparatus is a horizontal thin film dryer, a horizontal thin-film evaporator, a horizontal wiped-film dryer, or a horizontal wiped-film evaporator. In a third embodiment, the apparatus is a Combi dryer (combining vertical and horizontal designs) from LCI Corporation. The thin film or wiped-film dryer/evaporator can be operated in batch or continuous modes with a wide range of residence times depending on the configuration of the dryer.

In one embodiment, the drying apparatus is a rotary kiln dryer, which can be either a rotating inclined cylinder or a rotating heat exchanger. In one embodiment, the rotary kiln is one of a direct fired rotary kiln, an indirect fired rotary dryer, an electrically heated rotary kiln, and a microwave heated rotary kiln. Residence time in the rotary kiln dryer depends on the dimension of the kiln, and varies from 2 to 250 minutes.

In one embodiment, the drying treatment of spent catalyst is at atmospheric pressure. In a second embodiment, at a pressure from 0 to 10 psig. In one embodiment, the drying is done under an inert condition, e.g., nitrogen, at a nitrogen flow ranging from 0.2 to 5 scf/min. In one embodiment, the nitrogen flow ranges from 0.5 to 2 scf/min. Other general conditions, i.e., temperature and residence time, can be varied accordingly for organic matters to be evaporated from the catalyst. In one embodiment, the residence time in the drying apparatus ranges from 5 minutes to 240 minutes. In a second embodiment, from 10 to 120 minutes. In a third embodiment, at least 15 minutes. In a fourth embodiment, in the range of 30-60 minutes. With respect to the treatment temperature, it can be varied according to the type of apparatus used, the applied pressure and the level of heavy oil and solvent remaining in the spent catalyst. In one embodiment with the use of a vertical thin-film dryer, the temperature is generally in the range of 300 to 450° F. (149 to 232° C.). In a second embodiment with the use of a horizontal thin-film dryer, the temperature is in the range of 400-700° F. (204 to 371° C.). In a third embodiment with the use of rotary kiln dryer, the temperature is in the range of 700 to 1200° F. (371 to 649° C.).

In one embodiment, the drying temperature is at a sufficiently high temperature to decompose at least 90% of the surface active compounds and/or precursors thereof (collectively referred as "surface active compounds"), that may be bound to the catalyst particles. In another embodiment, at least 95% of the surface active compounds thereof are removed with the use of the dryer.

In one embodiment, the surface active compounds are any of polar organic compounds, non-polar organic compounds, organo-metallic complexes, inorganic compounds and combinations thereof In one embodiment, the compounds are surface active hydrocarbon compounds, comprising carboxylates.

In one embodiment, the drying step involves at least a two-stage drying process, with the $2^{nd}$ drying stage is for the removal of contaminants, e.g., carboxylates, residual oil in the pore space of the spent catalyst, etc., volatilizing the organic compounds for removal. In one embodiment, the retentate stream from the deoiling zone containing highly concentrated spent catalyst in solvent is first fed into a rotary drum dryer (operating at a temperature of less than 200° C.) before going into a rotary kiln dryer (operating at a temperature greater than 300° C.), with a rotation ranging from 0.5 to 10 rpm and a retention time ranging from 5 to 200 minutes. The feed rate to the kiln is based on the diameter of the kiln. In one embodiment with the use of a 6" diameter kiln, the feed rate to the kiln ranges from 2 to 10 lbs. of solid per hour. In another embodiment with a 18" kiln, the feed rate ranges from 10 to 300 lbs. of solid materials per hour.

In yet another embodiment, the retentate stream is first dried in a Combi dryer with an operating temperature in the range of 200 to 450° F. (93 to 232° C.) in the vertical section, a temperature in the range of 400-900° F. (204 to 482° C.) in the first half of the horizontal section, and with a temperature in the last half of the horizontal section (or the cooling section) in the range of 50-100° F. (10 to 38° C.). Temperature of the stream exiting the Combi drier in one embodiment ranges from 80 to 120° F. (27-49° C.).

In one embodiment, the drying zone comprises a plurality of drying apparatuses to maximize the removal of contaminants, e.g., carboxylates, residual oil in the pore space of the spent catalyst, etc. In one embodiment, the retentate stream from the deoiling zone is first fed into a Combi dryer, wherein most of the solvent is removed, for an exit stream consisting essentially of catalyst (as a dry powder) and residual heavy oil (ranging from 0.1 to 1 wt. % in one embodiment, and less than 0.5 wt. % in a second embodiment). The Combi dryer in one embodiment is maintained under a blanket of nitrogen, with nitrogen provided as a counter-current flow in an amount ranging from 0.2 to 5 scf/min. This dry powder in next sent to a $2^{nd}$ drying stage in a rotary kiln dryer, wherein residual organic materials, e.g., heavy oil, is burnt off. In the rotary kiln, nitrogen can be supplied as co-current or counter-current flow. The residence time in the $2^{nd}$ stage ranges from 10 to 150 minutes in one embodiment.

The volatized organic compounds after leaving the catalyst particles can be collected in condensers, wherein the heavy oil and/or solvents can be recovered.

Detergent Washing: In one embodiment, instead of or in addition to a drying unit for the removal of solvent/residual heavy oil in the catalyst (after membrane filtration), a surfactant is used to remove solvent and/or heavy oil bound to the catalyst. The surfactant solution is added to the retentate stream out of the membrane filtration unit. In another embodiment, the surfactant solution is added to the stream containing catalyst particles and hydrocarbons, i.e., solvent plus residual heavy oil, out of the drying zone.

In a vessel, e.g., a mixing tank with mechanical agitation, the surfactant attracts solvent/any residual heavy oil away from the spent solid catalyst with its hydrophilic head that is attracted to water molecules and hydrophobic tail that repels water and attaches itself to the solvent and heavy oil. The opposing forces loosen/remove the solvent and heavy oil from the solid catalyst. The mixing of the cleaning solution containing surfactants and the mixture of spent catalyst and hydrocarbons is for a sufficient amount of time and under conditions sufficient to remove the hydrocarbons from the catalyst surface into the aqueous solution. The mixture of surfactant/solvent/heavy oil in water can be subsequently separated from the solid catalyst through separation means known in the art, including but not limited to decantation and the use of settling tanks.

In one embodiment, the mixing temperature is in the range of about 30° C. to 85° C. In a second embodiment, the mixing is at a temperature of less than 85° C. In a third embodiment, at a temperature of up to 177° C. In one embodiment, the mixing (contacting) of the cleaning solution and the mixture of spent catalyst and hydrocarbons is for at least two minutes. In a second embodiment, for at least 5 minutes. In a third embodiment, for at least 10 minutes.

In one embodiment, the surfactant is first dissolved in water, e.g., deionized water, in a concentration between about 0.001% and saturation. In a second embodiment, the surfactant is added in a concentration between 0.01% to about 10%. In a third embodiment, at a concentration between 0.5% to about 5%. In a fourth embodiment, at a concentration sufficient to dissolve and remove at least 90 wt. % of the hydrocarbons, i.e., solvents and heavy oil, from the surface of the catalyst particles. In a fifth embodiment, the concentration of the surfactant is sufficient to dissolve and remove at least 95 wt. % of the hydrocarbons from the catalyst particles.

In one embodiment, the surfactant is selected from the group of anionic, nonionic, zwitterionic, acidic, basic, amphoteric, enzymatic, and water-soluble cationic detergents and mixtures thereof. In one embodiment, the surfactant is an anionic detergent.

In one embodiment, the detergent is an anionic surfactant selected from water-soluble salts, particularly the alkali metal, ammonium and alkanolammonium salts, of organic sulfuric reaction products having in their molecular structure an alkyl group containing from about 8 to about 22 carbon atoms and a sulfonic acid or sulfuric acid ester group. (Included in the term "alkyl" is the alkyl portion of acyl groups.) Examples of this group of synthetic surfactants include sodium and potassium alkyl sulfates, especially those obtained by sulfating the higher alcohols ($C_8$-$C_{18}$ carbon atoms) produced by reducing the glycerides of tallow or coconut oil, sodium and potassium $C_8$-$C_{20}$ paraffin sulfonates, and sodium and potassium alkyl benzene sulfonates, in which the alkyl group contains from about 9 to about 15 carbon atoms in straight chain or branched chain configuration.

In another embodiment, the anionic surfactant compound is selected from the group of sodium alkyl glyceryl ether sulfonates, and sodium or potassium salts of alkyl phenol ethylene oxide ether sulfate containing about 1 to about 10 units of ethylene oxide per molecule and wherein the alkyl groups contain about 8 to about 12 atoms. In yet another embodiment, the anionic surfactant is selected from sodium linear $C_{10}$-$C_{12}$ alkyl benzene sulfonate; triethanolamine $C_{10}$-$C_{12}$ alkyl benzene sulfonate; sodium tallow alkyl sulfate; sodium coconut alkyl glyceryl ether sulfonate; and the sodium salt of a sulfated condensation product of tallow alcohol with from about 3 to about 10 moles of ethylene oxide; mixtures of sodium and potassium alkyl sulfates In one embodiment, the surfactant is a nonionic surfactant. Examples include the water-soluble ethoxylates of $C_{10}$-$C_{20}$ aliphatic alcohols and $C_6$-$C_{12}$ alkyl phenols.

In one embodiment, the surfactant is a semipolar surfactant. Examples include water-soluble amine oxides containing one alkyl moiety of from about 10 to 28 carbon atoms and 2 moieties selected from the group consisting from 1 to about 3 carbon atoms; water-soluble phosphine oxides containing one alkyl moiety of about 10 to 28 carbon atoms and 2 moieties selected from the group consisting of alkyl groups and hydroxyalkyl groups containing from about 1 to 3 carbon atoms; and water-soluble sulfoxides containing one alkyl moiety of from about 10 to 28 carbon atoms and a moiety selected from the group consisting of alkyl and hydroxyalkyl moieties of from 1 to 3 carbon atoms.

In one embodiment, the surfactant is an amholytic surfactant. Examples include derivatives of aliphatic or aliphatic derivatives of heterocyclic secondary and tertiary amines in which the aliphatic moiety can be straight chain or branched and wherein one of the aliphatic substituents contains from about 8 to 18 carbon atoms and at least one aliphatic substituent contains an anionic water-solubilizing group.

In yet another embodiment, the surfactant is a zwitterionic surfactant. Examples include derivatives of aliphatic quaternary ammonium, phosphonium and sulfonium compounds in which the aliphatic moieties can be straight or branched chain, and wherein one of the aliphatic substituents contains from about 8 to 18 carbon atoms and one contains an anionic water-solubilizing group.

It is further envisaged to use common surfactants including but not limited to vegetable derived surfactants; household detergents including natural oils such as orange oils, citrus oils, etc.; commercially available degreasers; and common laboratory surfactants and detergents, e.g., alkyl sulphates, alkyl ethoxylate sulphates. In one embodiment, the surfactant is sodium laureth sulfide (SDS), Brij detergents and niaproff anionic detergents. In another embodiment, the anionic detergent is a proprietary blend of sodium linear alkylaryl sulfonate, alcohol sulfate, phosphates and carbonates commercially available as known as ALCONOX™. In yet another embodiment, the surfactant is a commercially known detergent by the name of LIQUINOX™.

It is further envisaged that surfactants do not have to be added as a cleaning solution. In one embodiment, the surfactant solution is generated in-situ with the addition of precursor materials, e.g., alkali metal compounds such as sodium hydroxide, ammonium hydroxides, etc., such that at least a surfactant is generated in-situ for use in the detergent washing process.

Ultrasonic Cleaning: In one embodiment, instead of or in addition to the use of detergent for the cleaning/removal of solvent and heavy oil from the spent catalyst, ultrasonic cleaning is employed. Ultrasonic cleaning herein involves the use of high-frequency sound waves (above the upper range of human hearing, or about 18 kHz). In one embodiment, ultrasonic transducers are employed with a frequency ranging from 20 to 80 kHz. In a third embodiment, the frequency employs ranges from 15-400 kHz. The ultrasonic tank in one embodiment is maintained at a temperature of at least 50° C.

in one embodiment, and at least 70° C. in a second embodiment, up to a temperature of at least 6° C. below the boiling point of the solvent still remaining with the spent catalyst.

In one embodiment, ultrasonic/acoustic energy is applied to the cleaning solution for less than 15 minutes. In one embodiment, from 0.25 to 10 minutes. In a third embodiment, for less than 60 minutes. In one embodiment the organic components such as solvent and heavy oil attached to the catalyst particles are fully dislodged from the surfaces with the implosion of the bubbles initiated by the ultrasonic energy. In a subsequent separation process, e.g., a cyclone, a decanter or settling tank, the deoiled fine catalyst particles can be separated and collected from the bottom. The aqueous phase containing solvent and heavy oil can be sent to a water treatment apparatus, wherein the fraction enrich with organic matters can be recovered and water can be recirculated as clean water to the detergent washing process. It is also possible to clean the waste water by ultrafiltration, adsorption column or other means before it is reused as wash water in the detergent washing process.

Plasma Cleaning: In one embodiment, instead of or in addition to ultrasonic cleaning or using at least a surfactant for the cleaning/removal of solvent and heavy oil from the spent catalyst, plasma cleaning is employed. In some embodiments, it is advantageous to use a plasma system as compared to a convention dryer is that a typical plasma jet is at much higher temperature than a typical oil or gas burner. Therefore the heat transfer, dependent on the temperatures of the energy source and the heated substance, can be higher in a plasma process, increasing the energy efficiency of the plasma process.

In one embodiment, the plasma cleaning process operates at a temperature between 400 to 900° C. (752 to 1652° F.) in order to volatize the residual hydrocarbons, i.e., heavy oil residues and solvent, in the catalyst particles. The volatized organic compounds after leaving the catalyst particles can be collected in condensers, wherein the heavy oil and/or solvents can be recovered. The plasma reactor/vessel can be maintained under an inert blanket or reducing atmosphere to allow the recovery of the organic materials after volatilizing them in the plasma reactor as effluent gases, leaving behind the catalyst particles as dry powder containing less than 0.5 wt. % hydrocarbons as solvent materials and/or residual heavy oil.

In one embodiment, the plasma cleaning system comprises a vessel (e.g., a mixing tank or a reactor), a plasma system for heating the mixture of catalyst particles and hydrocarbons within the vessel, and means for collecting the effluent gases. In one embodiment, the plasma system comprises graphite electrodes and electric arcs maintained between the graphite electrodes. In another embodiment, the plasma system comprises a plurality of plasma torches located within the vessel reactor. In one embodiment, a condenser system is employed to collect and recover the volatized hydrocarbons. In yet another embodiment, a splitter column is employed to collect and separate solvents from residual heavy oils in the volatized hydrocarbons collected from the plasma system.

Reference will be made to the figures to further illustrate embodiments of the invention.

Figure 4:
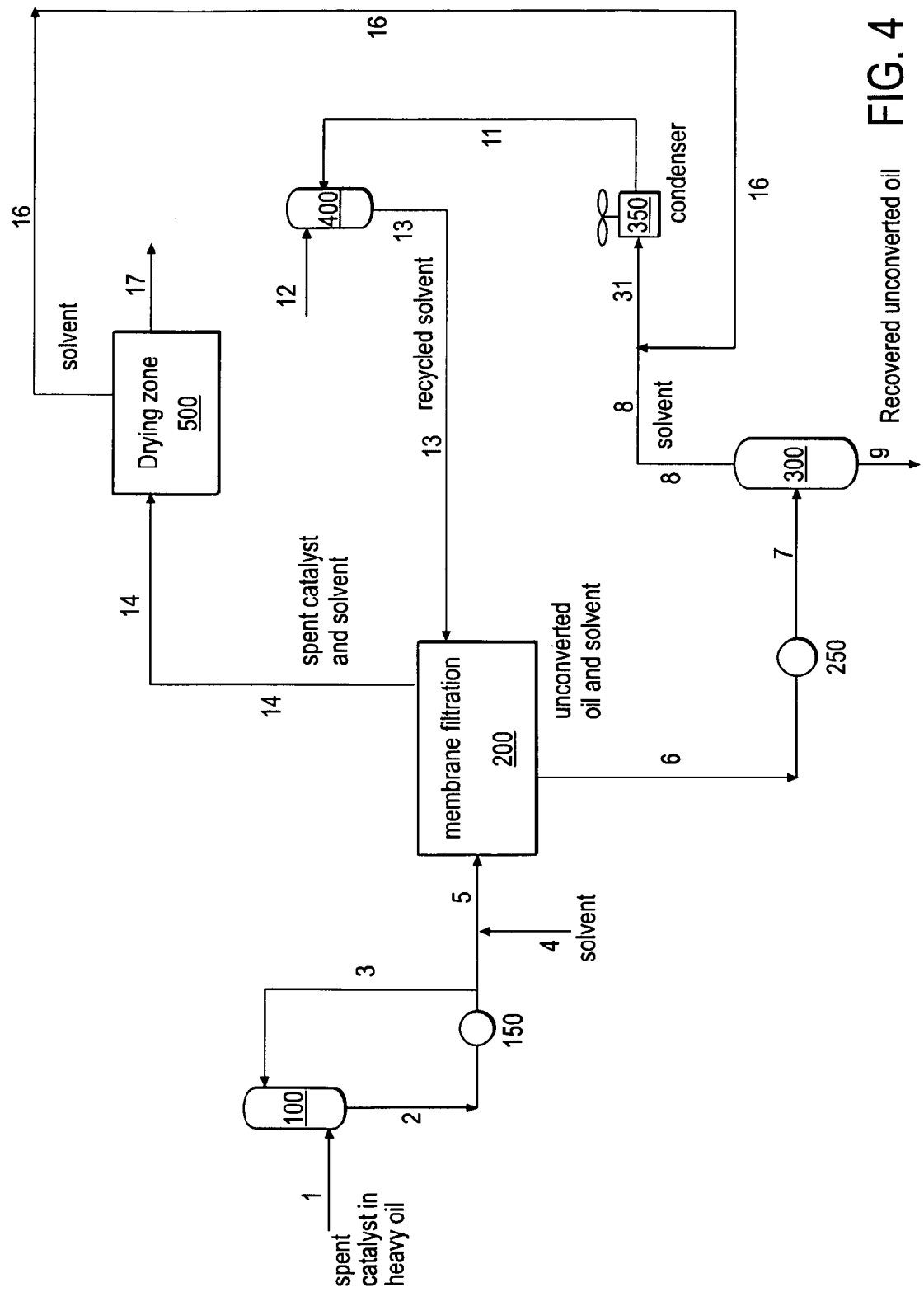
FIG. 4 is a block diagram of an embodiment of a deoiling operation.

In one embodiment of a deoiling zone as illustrated in FIG. 4, feedstock stream 1 to deoiling zone 200 enters slurry drum 100 where feedstock 1 is stored and continuously mixed by slurry pump 150. Feedstock 1 leaves slurry drum 100 via line 2 and passes to slurry pump 150, which pumps feedstock 1 up to the operating pressure of deoiling zone 200. A portion of the feedstock in line 2 is recycled to slurry drum 100 through line 3 to agitate the feedstock and prevent agglomeration of the catalyst particles in slurry drum 100. A main portion of the feedstock in line 2 continues to deoiling zone 200, but just before entering deoiling zone 200, feedstock 1 is mixed with a light hydrocarbon solvent 4, for example, a toluene rich stream, to dilute the unconverted resid hydrocarbon oil and form stream 5, which is fed to deoiling zone 200.

In one embodiment, the light hydrocarbon solvent 4 is toluene. In deoiling zone 200, unconverted oil is removed from the catalyst particles of stream 5, leaving stream 6 consisting essentially of unconverted oil in the light hydrocarbon solvent, e.g., toluene. Stream 6 is sent to heat exchanger 250 to form heated stream 7, which enters separator 300 where flashed off overhead is toluene vapor stream 8 and unconverted oil is removed as stream 9. In an embodiment, separator 300 is a distillation column, in order to achieve a sharp separation between solvent and recovered oil. Stream 9 comprising unconverted oil can be recycled to the heavy oil upgrade process, e.g., a vacuum resid unit, for further processing or sent to product storage. Stream 14 from the deoiling zone 200 consists of catalyst particles, carbon fines, and metal fines less stream 6 consisting of unconverted oil in toluene. Stream 14 proceeds to drying zone 500 where toluene vapor stream 16 is separated from catalyst, carbon fines, and metal fines (i.e., hydrocarbon-free solids) in stream 17. The drying zone can be evaporation and solids devolatilization equipment known to those skilled in the art. In one embodiment (not shown), stream 17 is routed to a metal recovery system wherein the metals in the catalyst can be recovered and subsequently used in a catalyst synthesis unit.

Toluene vapor streams 8 and 16 are combined into composite toluene vapor stream 31, which enters condensing unit 350 where the toluene is converted from a vapor state to a liquid state and leaves the condensing unit as liquid toluene stream 11. Liquid toluene stream 11 enters solvent storage drum 400, from which toluene is recycled to the deoiling zone 200 via line 13. Make-up toluene stream 12 is added to solvent storage drum 400, since a small amount of toluene is lost through vaporization.

Figure 5:
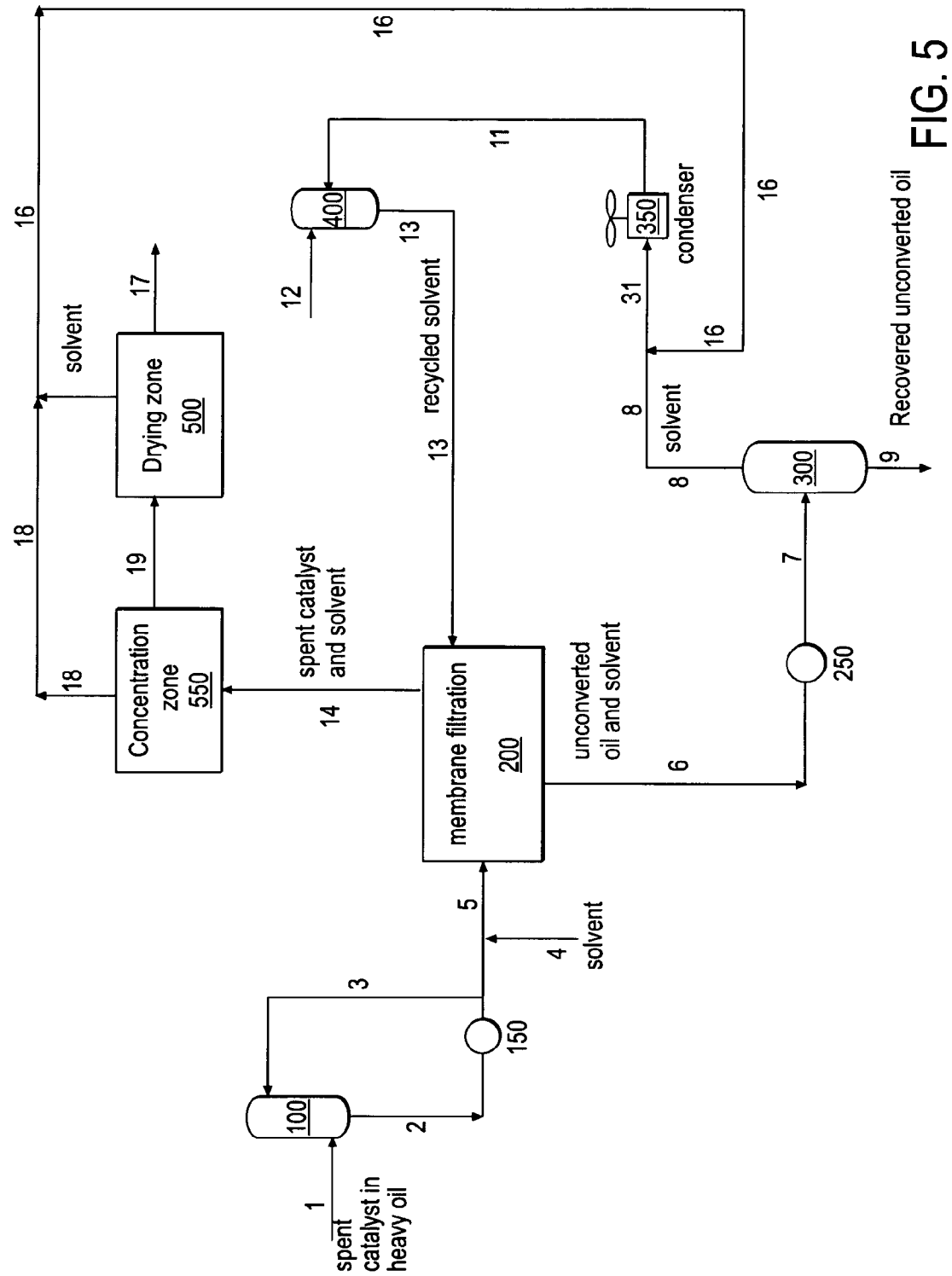
FIG. 5 is a block diagram of another embodiment of a deoiling unit, with a concentration zone.

In yet another embodiment of a deoiling system as illustrated in FIG. 5, stream 14 from the deoiling zone 200, consisting of catalyst particles, carbon fines, and metal fines less stream 6, can be sent to slurry concentration zone 550, from which a portion of stream 14 (stream 19) is fed to drying zone 500 and a portion of stream 14 is fed via line 18 to be mixed into toluene vapor stream 16 from drying zone 500.

Figure 6:
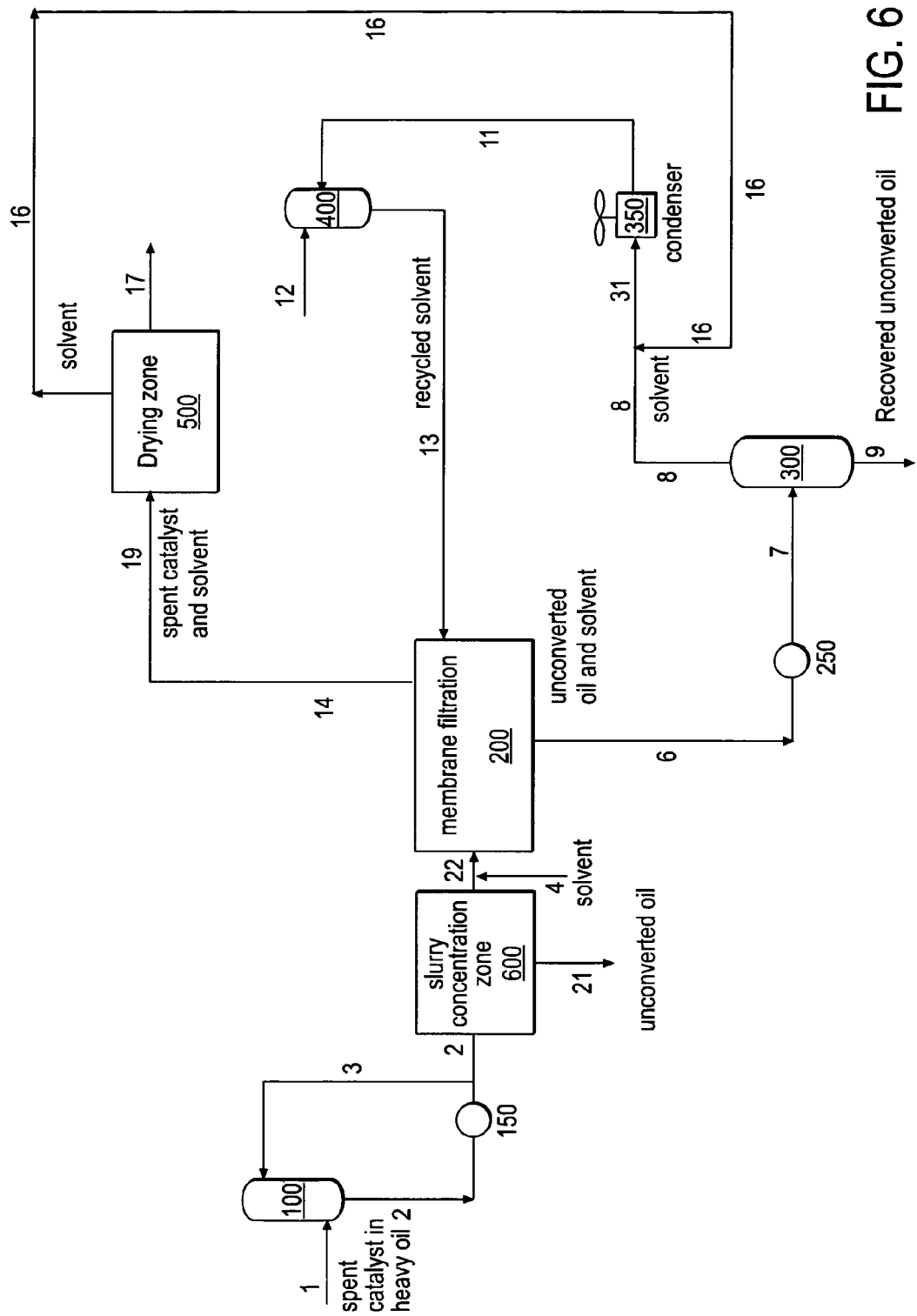
FIG. 6 is a block diagram showing a third embodiment of a deoiling unit, with a slurry concentration zone.

In another embodiment as illustrated in FIG. 6, before the feedstock stream (containing spent catalyst in heavy oil) 1 is mixed with light hydrocarbon solvent 4, line 2 can be fed to slurry concentration zone 600, from which unconverted oil 21 is removed. Stream 22 (i.e., feedstock 1 less unconverted oil 21) is then be mixed with light hydrocarbon solvent 4 and fed to deoiling zone 200.

Figure 7:
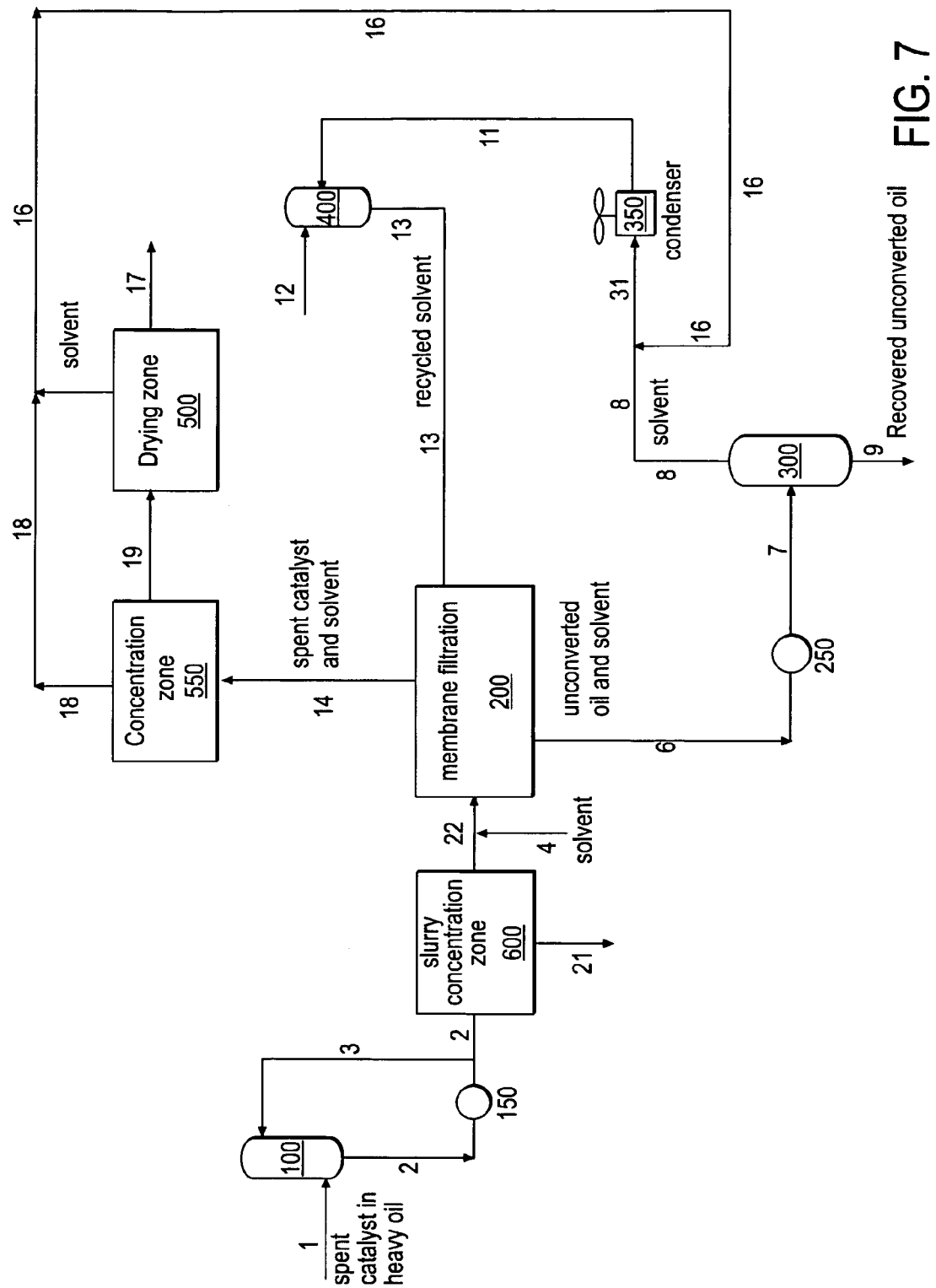
FIG. 7 is a block diagram showing another embodiment of a deoiling unit, employing a concentration zone as well as a slurry concentration zone.

FIG. 7 illustrates the deoiling system as illustrated in FIG. 2, which further contains a slurry concentration zone 550 (as illustrated in FIG. 5) and the slurry concentration zone 600 of FIG. 6.

Figure 8:
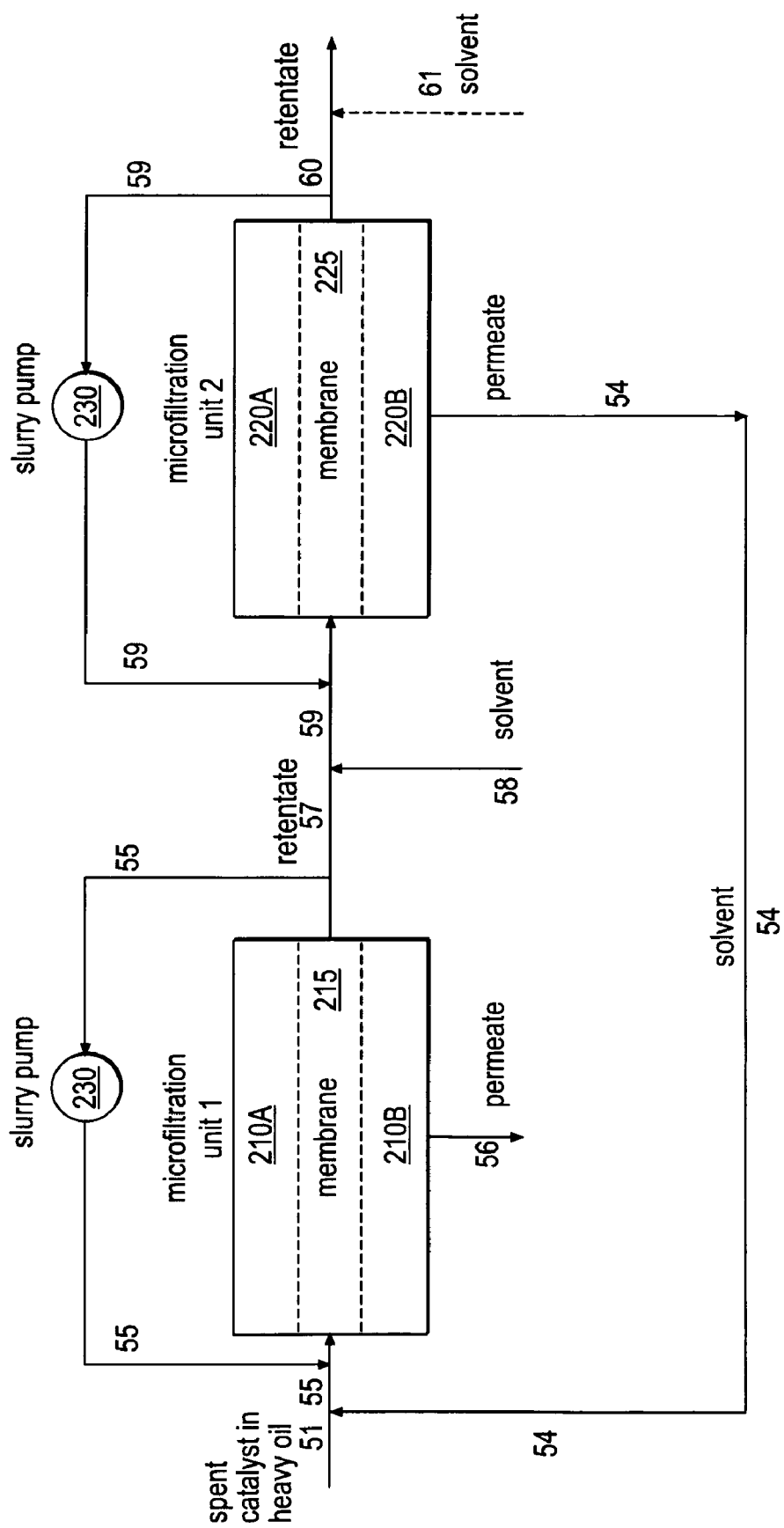
FIG. 8 is a block diagram illustrating an embodiment of a membrane filtration system with multiple cross-flow filtration units.

With reference to FIG. 8, feedstock 51 is mixed with light hydrocarbon solvent 54 to form stream 55, which is fed to a first filtration unit consisting of membrane 215 separating top section 210A and bottom section 210B. Typically, stream 55 enters the tube side of a multi-tube bundle of membrane elements with the permeate stream 56 exiting the shell side of the membrane housing. In the description that follows, light hydrocarbon solvent 54 is a toluene rich stream (i.e., permeate from the second stage of filtration). Slurry pump 230 maintains a constant velocity in the tubes, preventing settling or agglomeration of catalyst particles. A portion of unconverted oil along with toluene passes through membrane 215 to bottom section 210B and out of the first filtration unit as stream 56 and can be sent to a distillation process to recover toluene and unconverted oil as separate streams. Retentate stream 57 is diluted with a toluene rich stream 58 to form stream 59, which is passed to a second filtration unit. The second filtration unit consists of membrane 225 separating top section 220A and bottom section 220B. Slurry pump 240 maintains a constant velocity in top portion 220A above membrane 225 and keeps stream 59 in continuous motion, preventing settling or agglomeration of catalyst particles. A portion of unconverted oil along with toluene passes through membrane 225 to bottom section 220B and out of the second filtration unit as stream 54, which is recycled to be mixed with feedstock 51 to form stream 55.

Figure 9:
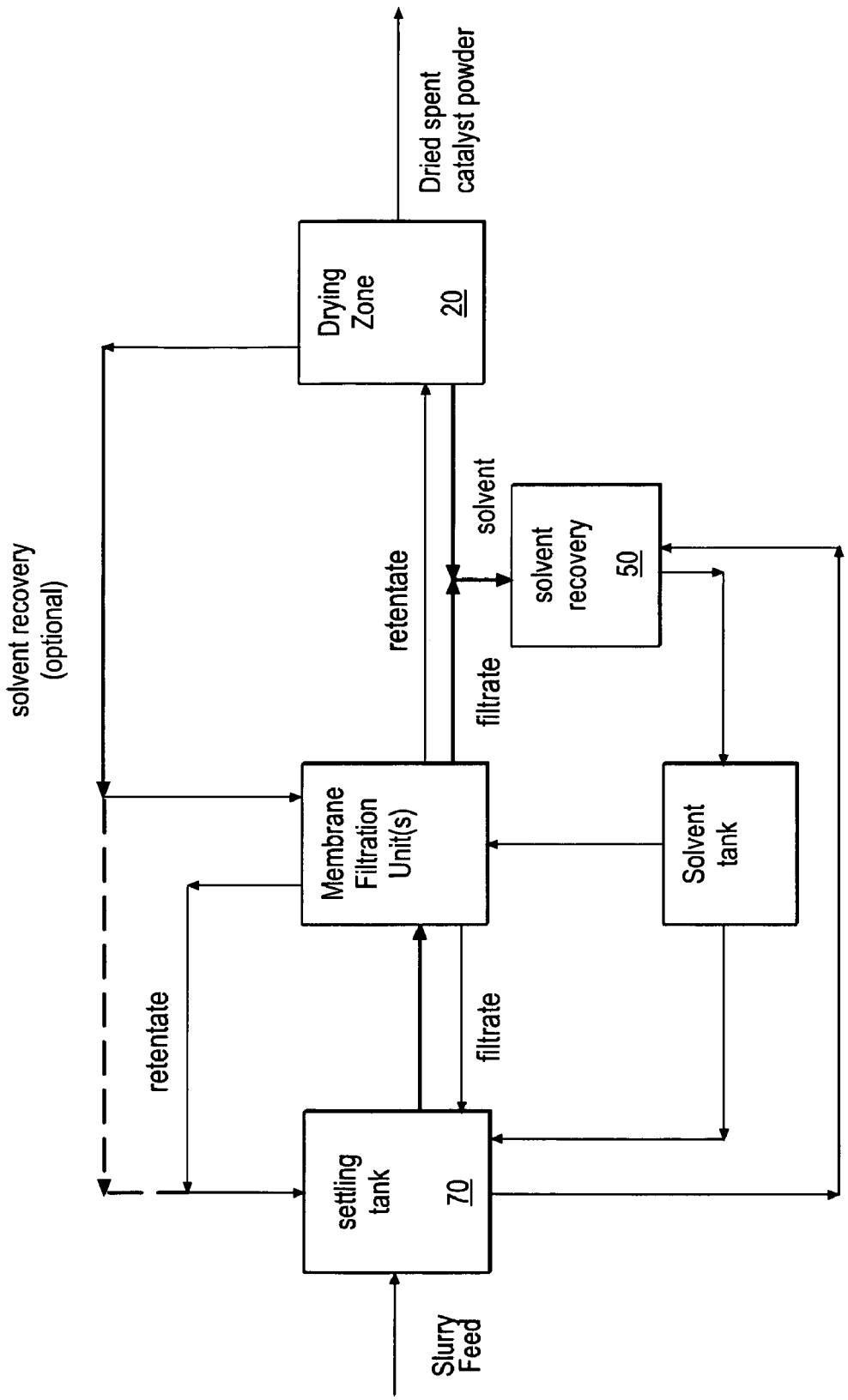
FIG. 9 is a block diagram illustrating an embodiment of a membrane filtration system with a settling tank for solvent washing.

FIG. 9 illustrates an embodiment of a deoiling zone with the use of a settling tank system 70 for pre-mixing/washing of the catalyst slurry from a heavy oil upgrade system. Solvent feed to the settling tank can be recycled solvent from any of the drying zone 20 or the solvent recovery system 50. In one embodiment, a portion (or all) of the filtrate from the filtration unit is recycled back to the settling tank 70 as shown. In another embodiment, a portion (or all) of the retentate is recycled back to the settling tank 70 as shown. In yet another embodiment (not shown), recycled solvent from the recycling zone can also be diverted to the settling tank for use in washing the feed stream comprising slurry catalyst in heavy oil.

Figure 10:
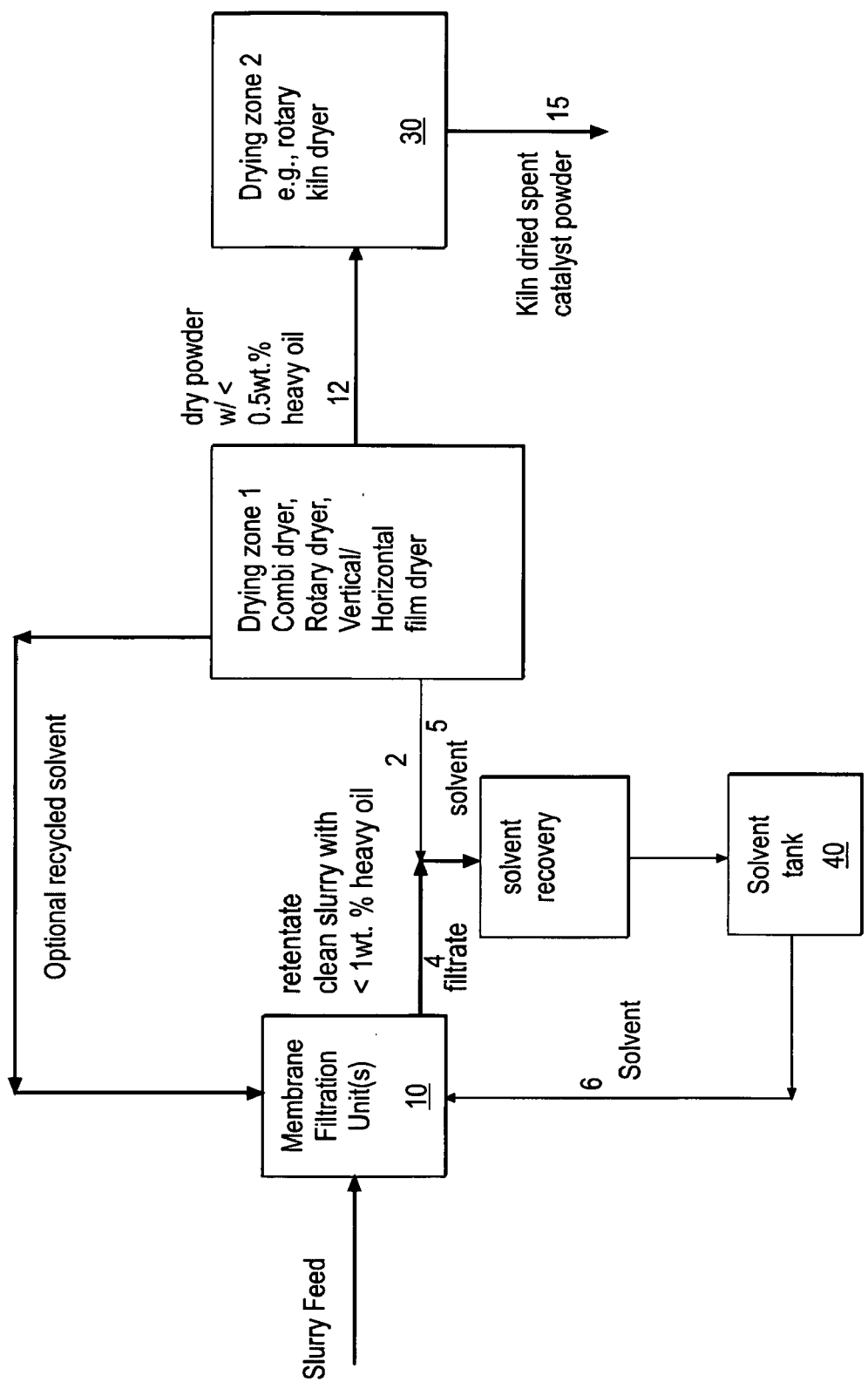
FIG. 10 is a block diagram illustrating an embodiment of a deoiling system with a membrane filtration zone and a two-staged drying zone, including a Combi dryer and a rotary kiln dryer.

FIG. 10 illustrates an embodiment of a system with a two-staged drying zone. The first drying zone can be any of a rotary dryer, a vertical thin-film dryer, a horizontal thin-film dryer, or a Combi dryer (combination of both vertical and horizontal). As shown, the filtrate from the membrane filtration unit comprising solvent and heavy oil is passed on to a solvent recovery unit. In this unit, the solvent is condensed into a liquid stream and passed on to a solvent tank. In one embodiment, the solvent recovery unit comprises a distillation column to achieve a sharp separation between solvent and heavy oil. Heavy oil can be recycled to a vacuum resid unit for further processing or sent to product storage. In the $1^{st}$ drying stage 20, a retentate stream 2 from the filtration unit is substantially concentrated, e.g., for a stream containing less than 0.2 wt. % heavy oil, up to 90 wt. % solvent and the remainder solid catalyst to transform into substantially dry powder form, with up to 1 wt. % heavy oil. Solvent vapor stream can be recovered (condensed) and recycled back to the membrane filtration unit or a settling tank (not shown) for mixing with the feed stream to the filtration unit.

In the $2^{nd}$ drying stage, e.g., a rotary kiln dryer, organic matters are substantially evaporated for a stream consisting essentially of dry spent catalyst powder including metal and carbon fines.

Metal Recovery from Dry Powder Catalyst: In one embodiment, the dry spent catalyst powder is sent to a metal recovery unit for recovery of valuable metals such as molybdenum, nickel, chromium, etc. for subsequent re-use in a catalyst synthesis unit. In one embodiment, the deoiled and dried spent catalyst particles first leached with an aqueous solution containing ammonia and air in an autoclave, i.e., a multi-chambered, agitated vessel at a sufficient temperature and pressure, in which ammonia and air are supplied to induce leaching reactions, wherein the group VIB (e.g., molybdenum) and group VIII metals (e.g., nickel) are leached into solution forming group VIB and group VIII soluble metal complexes.

The leached slurry is subsequently subject to liquid-solid separation via physical methods known in the art, e.g., settling, centrifugation, decantation, or filtration, and the like, into a liquid stream containing the group VIB and VIII metal complexes ("PLS" or pressure leached solution) and a solid residue comprising coke and any group VB metal (vanadium) complex. Following liquid-solid separation, the pH of the PLS stream controlled to a level at which selective precipitation of the metal complexes occurs ("pre-selected pH"), allowing the precipitation of at least 90% of the Group VIB metal, at least 90% of the Group VIII metal, and at least 40% of the Group VB metal initially present prior to the precipitation. In one embodiment, the metal complexes undergo further treatment/pre-selective pH conditioning to further recover the Group VIB and Group VIII metals as metal sulfides, which can be subsequently used in a catalyst synthesis unit.

Examples

The following illustrative examples are intended to be non-limiting.

Cross-flow Filtration Example. A feedstock of used resid hydroprocessing slurry phase catalyst (1 to 10 µm) in unconverted heavy oil product was processed using eight stages of cross-flow filtration. The cross-flow filtration was conducted at 175° C. and 75 psig. The feed slurry solids content was 12 weight %. In each stage the feed oil was diluted with an amount of toluene equal to the original feed slurry. The resulting mixture was circulated through the cross-flow filtration module until sufficient oil and toluene permeated through the membrane to create a reconcentrated slurry of 25 weight % solids. A recirculating pump maintained a sufficient velocity through the tubes of the filter housing (greater than 10 feet/second) to avoid membrane fouling.

The design of the membrane was such that only the oil could permeate through the walls of the tube into the shell side of the bundle while the fine solid catalyst was retained on the tube side. By repeating this process an additional seven times the catalyst was transferred into a substantially oil-free toluene stream. The resulting toluene slurry was evaporated in a combination vertical thin film/horizontal dryer to produce a dry solid. The hottest zone in the dryer was operated at a temperature of 550° F. Analysis of the dry solid gave less than 0.5 weight % toluene extractable oil, which indicates over 99.9% oil removal. This material was found to sufficiently deoiled to allow recovery of the active metals using a water based leaching process. An analysis of the permeate oil stream showed no detectable level of molybdenum, which provides confirmation that the molybdenum based catalyst was quantitatively recovered into the clean toluene slurry.

The single stage cross-flow filtration membrane module run eight times in sequence simulated an eight stage cross-flow system. However, a very large amount (7.75 times the fresh slurry rate) of toluene was used since each stage was cross-flow and a very high deoiling extent was targeted. In an embodiment, toluene is added only to the last stage and the toluene permeate cascades to the prior stage, requiring perhaps 5 or 6 stages (and a toluene rate of 2-3 times the fresh slurry rate).

Dynamic Filtration Example. Catalyst in oil exchanged with toluene was tested at 100° C. (temperature correction base). Twenty gallons of a catalyst/oil slurry feed were tested. First, the solids were concentrated in oil and then the solids were washed or diafiltered in oil slurry using toluene as the wash solvent (i.e., the oil was exchanged with solvent). The pumpable catalyst/oil slurry contained 14 weight % catalyst solids and other solids and 86 weight % oil. In an embodiment, the oil is removed and replaced by toluene until the oil concentration is less than about 2 weight %.

Specifically, toluene was used as a replacement solvent to displace the oil and keep the total solids at a pumpable level. Any permeate containing oil or toluene can be sent to a distillation column for recovery. The final washed catalyst solids can be further treated using another technology. Only oil, toluene, and soluble solids would pass through the membrane, while catalyst solids would be retained. Accordingly, catalyst slurry in a liquid form with reduced amounts of oil is produced, which would be suitable for additional treatment steps. In an embodiment, at least about 95 weight % of the solids in the final washed concentrate (retentate) is recovered. Heating equipment was used and a sealed nitrogen purged tank was used to process the feed liquid.

Testing was conducted by isolating as many of the variables as possible to determine optimum variables. Variables included type of membrane, temperature, pressure, concentration factor, and fouling. Variables were tested as follows.

The sample material was pre-screened using a 100-mesh screen to remove large particles and then placed into a feed tank connected to a Series L V*SEP Machine from New Logic. The membranes were installed and feed was introduced and pumped into the Series L V*SEP Machine.

Figure 11:
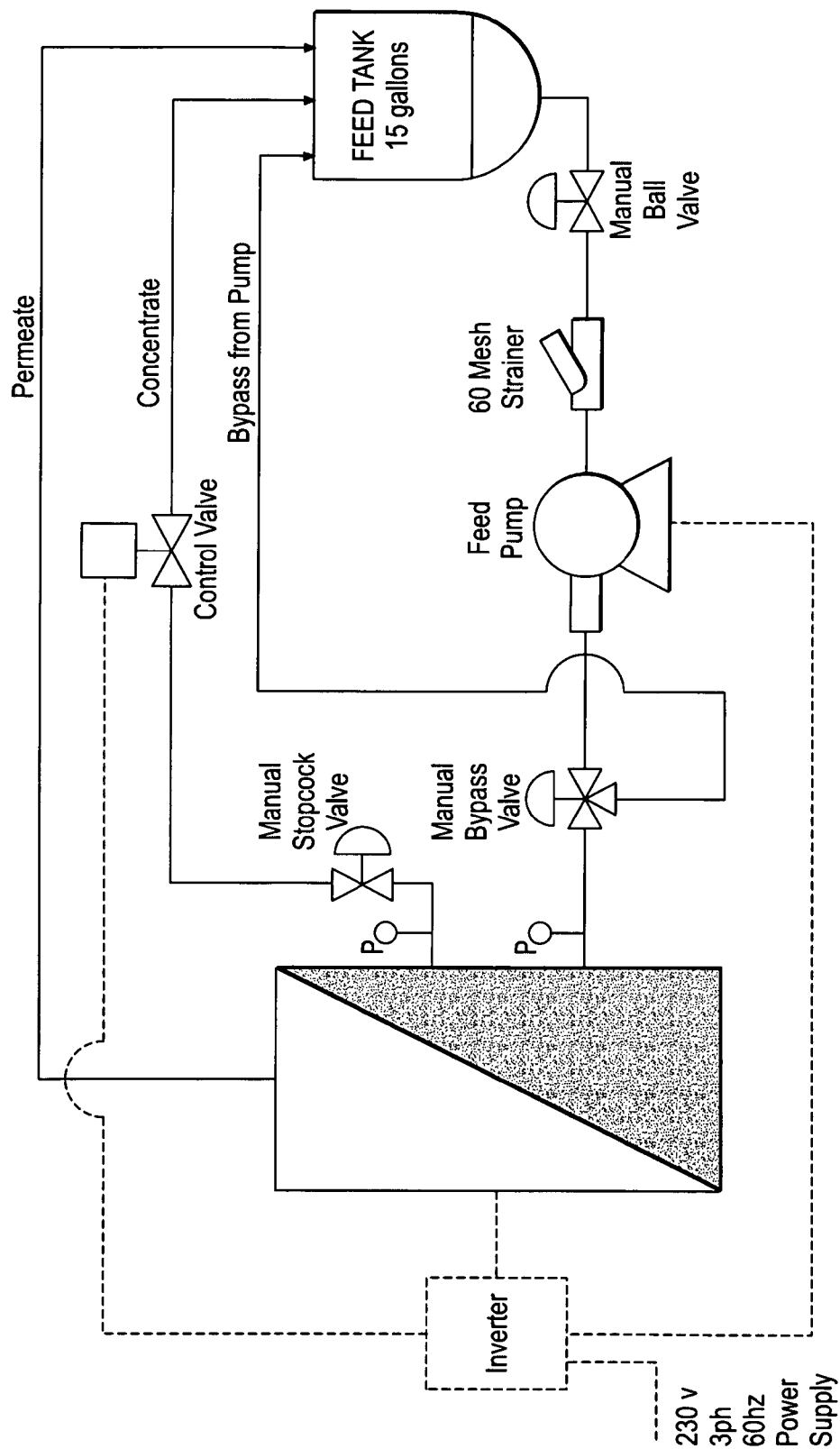
FIG. 11 is a block diagram showing a recirculation operation in an embodiment employing dynamic filtration, e.g., a Vibratory Shear Enhanced Processing (V*SEP) unit.

Step 1. Membrane Study. The membrane study was used to evaluate a variety of membranes on the sample material to determine the optimum membrane in terms of flux and/or permeate quality. The performance was measured in "recirculation mode," meaning that the material was not concentrated but the separated streams were returned to the feed tank and only the relative performance of each membrane under the same conditions was measured. A exemplary "recirculation mode" is shown in FIG. 11.

Step 2. Pressure Study. The pressure study was used to determine the optimum pressure of the chosen membrane on the particular feed material. The permeate rate was measured as incremental increases in pressure were made to the system. The pressure study determined whether it is possible to reach a point at which increased pressure does not yield significant increase in permeate flow rate, and at what pressure increasing pressure further does not yield significant increase in permeate flow rate.

Step 3. Long Term Line-Out Study The long term line-out study was used to measure the flux versus time to determine if the permeate rate is stable over a period of a time. The long term line-out study was an extended test to verify whether the system will lose flux, as do tubular cross flow systems. The results of the long term line-out study can also be used to determine a cleaning frequency, if one is necessary.

Step 4. Washing Study The washing study was designed to measure flux versus wash volume in order to evaluate an average flux over each individual washing. The washing study was completed in batch mode, as the membrane area of the Series L V*SEP Machine was only 0.5 ft2. Permeate was continually removed from the system while the concentrated material was returned to the feed tank. The washes were added one at a time and when an equivalent amount of permeate compared to the added wash water was removed then one wash was complete. For the washing study, one continuous wash was completed in batch mode. As permeate was removed, additional toluene was added to the tank.

Step 5. Concentration Study The concentration study was designed to concentrate the solids to a desired endpoint, if not obtained in the washing study. The concentration study was completed in batch mode, as the membrane area was only 0.5 ft2. Permeate was continually removed from the system while the concentrated material was returned to the feed tank. The resulting data was used to determine the average flux over the concentration/recovery range, which, in turn, allows for preliminary system sizing.

Test conditions included a temperature of about 90-100° C. (temperature corrected to 100° C.), a pressure of about 100-120 psi for the membrane study and 90 psi for the washing study, a sample size of 20 gallons, and, as noted above, a membrane area of 0.5 ft2.

Results—Membrane Selection. Two membranes having good chemical resistance and that can tolerate high temperature, detailed in Table 1, were selected for study.

TABLE 1

| Membranes Tested | | | | |
| --- | --- | --- | --- | --- |
| Membrane | Type | Pore Size | Maximum Temperature | Water Flux* |
| Teflon ® on Halar ® | Microfiltration | 0.05 μm | 200° C. | 500 gfd |
| Teflon ® on Woven Fiberglass | Microfiltration | 0.1 μm | 200° C. | 750 gfd |

*Average Batch Cell Test Results on New Membrane at 60 psi and 20° C.

The relative performance of each of the selected membranes was tested. The feed tank was prepared with the sample feed material and the system was configured in "recirculation mode". Each of the membranes shown above was installed and a two to four hour "line-out study" was conducted. The membranes were compared based on flux and permeate quality. Table 2 shows the relative performance of each membrane.

TABLE 2

| Results of Membrane Selection | | | |
| --- | --- | --- | --- |
| Membrane | Initial Flow* | Ending Flow* | Pressure |
| Teflon ® on Halar ® | 42.6 ml/min | 47.8 ml/min | 100 psi |
| Teflon ® on Woven Fiberglass | 25.8 ml/min | 11.7 ml/min | 120 psi |

*Temperature corrected to 100° C.

Figure 12:
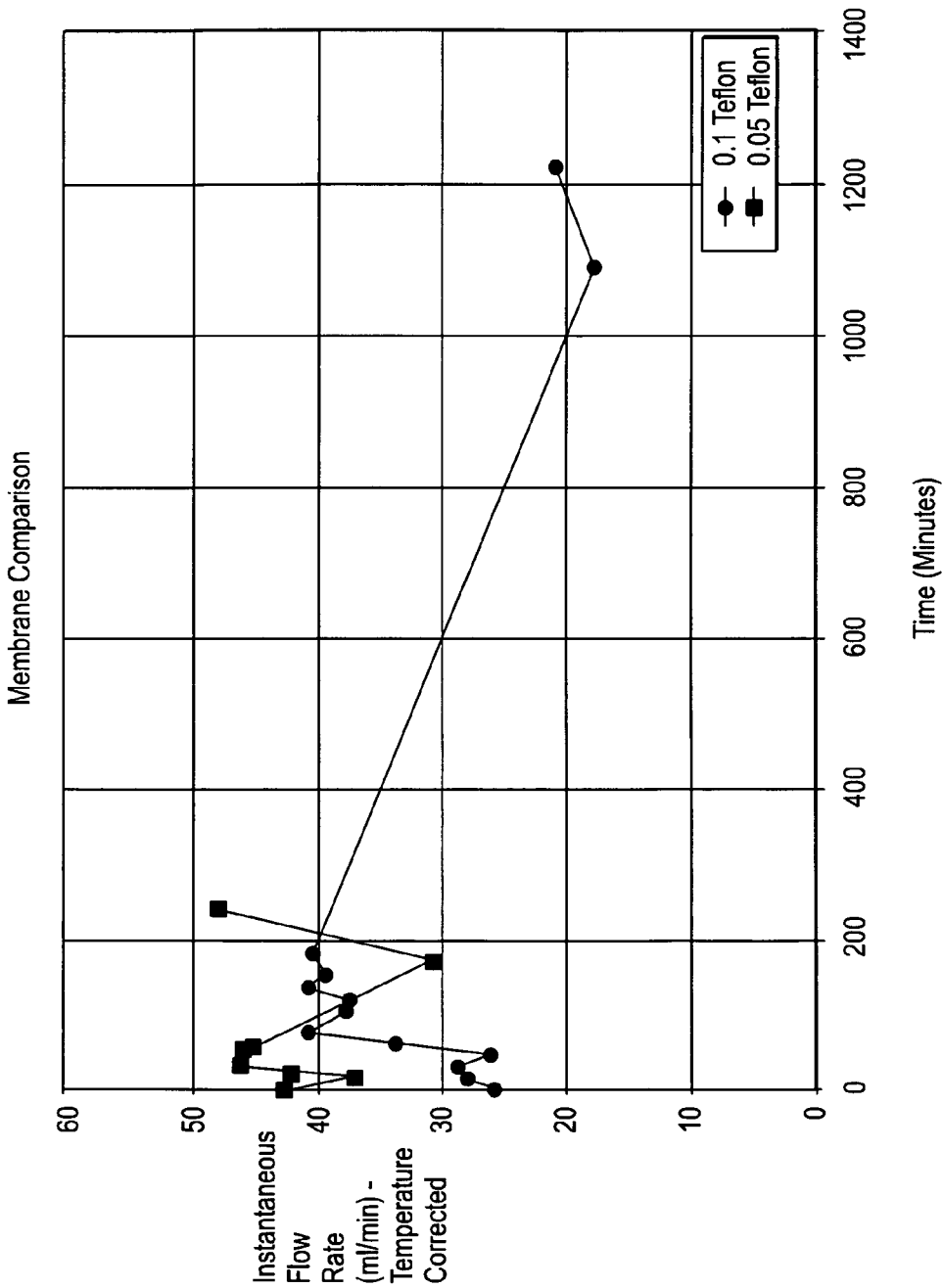
FIG. 12 is a graph of a membrane study in an embodiment employing dynamic filtration, e.g., a V*SEP unit.

FIG. 12 is a graph illustrating the results of the membrane study. The operating temperature was 100° C. Factors used to select a membrane may include, for example, flow rate, permeate flux rate, filtrate quality, chemical compatibility of the membrane, mechanical strength of the membrane, and temperature tolerance of the membrane. The 0.05 μm Teflon® membrane had better flux rates than the 0.1 μm Teflon® membrane. Analytical testing results on the filtrate from each showed that the 0.05 μm Teflon® membrane had 181 ppm of suspended solids in the filtrate, while the 0.1 μm Teflon® membrane had only 72 ppm of total suspended solids. The feed slurry was 9.18 weight % solids and 90.82 weight % oil. Accordingly, the 0.05 μm Teflon® membrane provided a better flow rate but worse permeate quality.

In addition to an excellent flow rate or permeate quality, the membrane must be durable and able to stand up to the feed material. Many materials are available for membrane construction, which remains an available optimizing technique. In addition to the membrane itself, all of the other wetted parts should be examined for compatibility. Both Halar® (ethylene chlorotrifluoro-ethylene) and woven fiberglass material chemically inert and would be compatible with toluene and the oil carrier. In addition, both would be capable of tolerating the 100° C. process temperature. The membranes are essentially equivalent in terms of chemical compatibility and temperature tolerance criteria.

However, in terms of mechanical strength of the membranes, woven fiberglass backing material is much stronger and would hold up better over the long term than Halar®. Accordingly, the 0.1 μm Teflon® membrane on woven fiberglass was chosen for further analysis.

Figure 13:
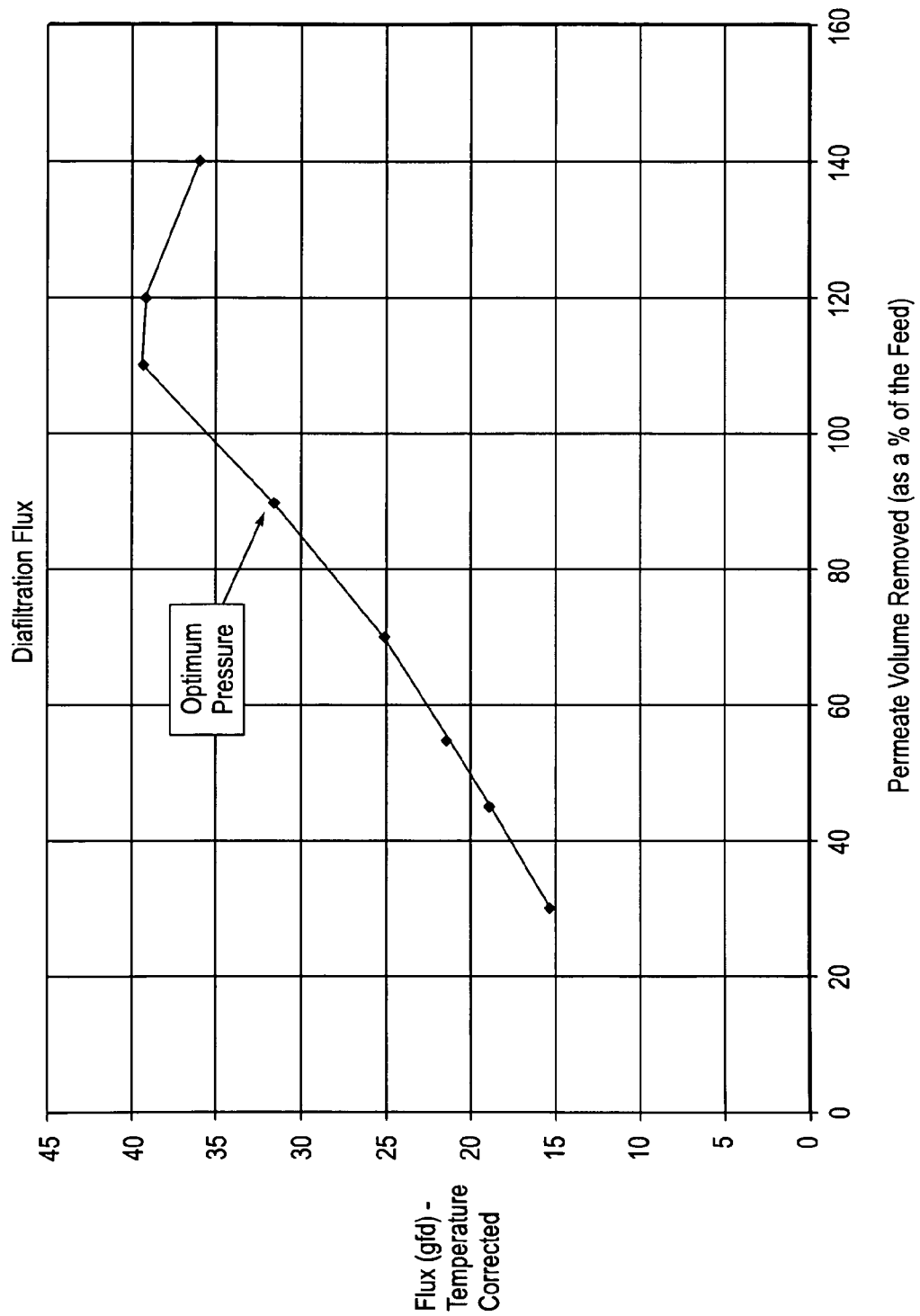
FIG. 13 is a graph of a pressure study in an embodiment employing dynamic filtration, e.g., a V*SEP unit.

Pressure Selection. The results of the pressure study are shown in FIG. 13. The operating temperature was 100° C. An optimum pressure was determined by measuring the flux at various pressures. The greatest flux occurred at 90 psi, giving an optimum pressure of 90 psi.

Initial Concentration. The system was started up first in "recirculation mode" and set to the optimum pressure and expected process temperature. The system was run for a few hours to verify that the flux was stable and the system has reached equilibrium.

Figure 14:
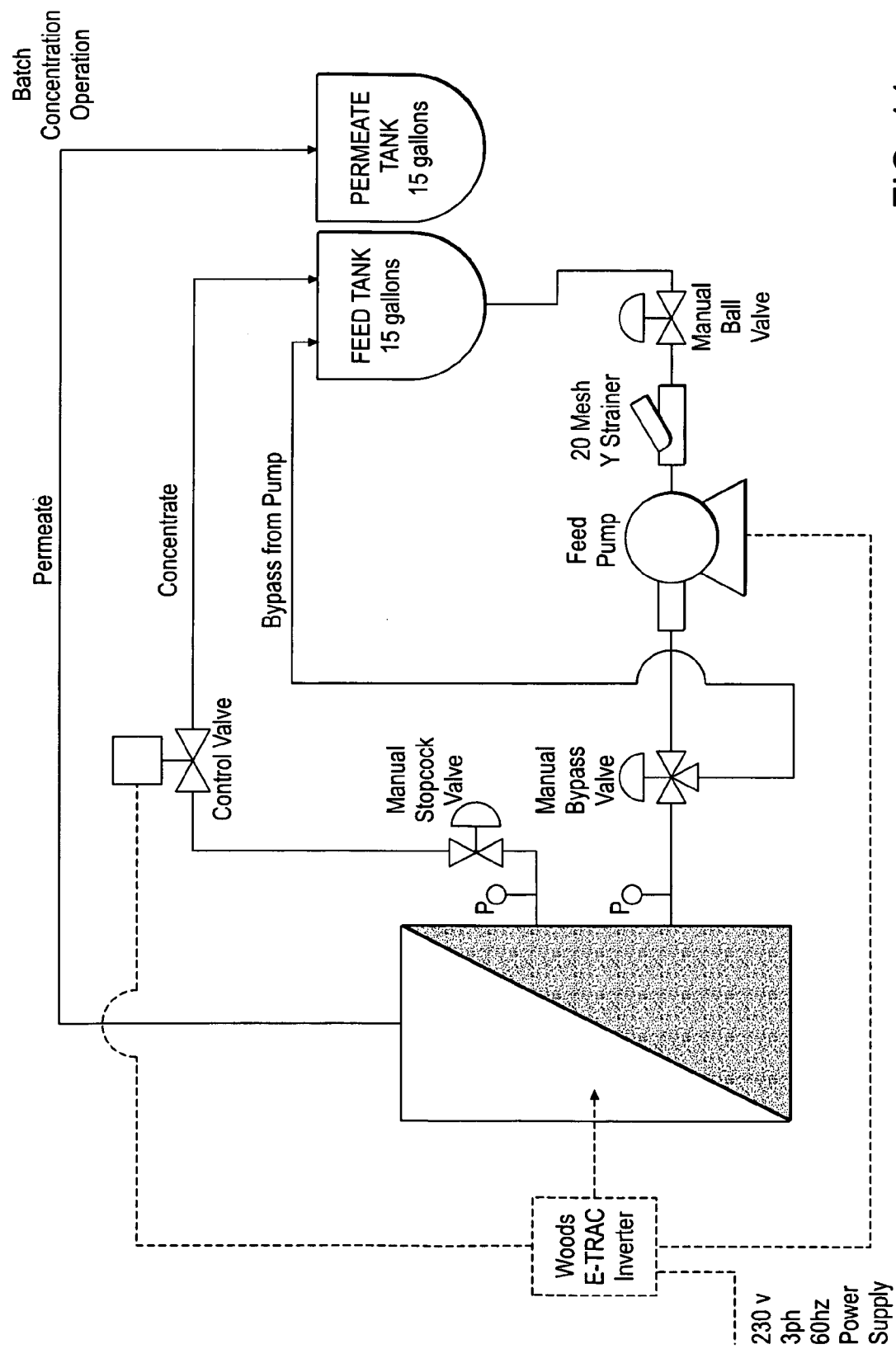
FIG. 14 is a block diagram showing a batch operation employing dynamic filtration, e.g., a V*SEP unit.

The permeate line was then diverted to a separate container so the system was operating in "batch" mode. The permeate flow rate was measured at timed intervals to determine flow rate produced by the system at various levels of concentration. As permeate was removed from the system, the solids concentration rose in the feed tank. FIG. 14 illustrates a batch mode operation.

Initial concentration allows for reduction of the volume of the feed by removing oil and concentrating the solids. As a result, it is possible to use less volume of wash solvent. No wash solvent has been added and only the initial solids are concentrated.

Table 3 shows the mass balance results of the initial concentration.

TABLE 3

Mass Balance Results

| Initial Volume | Ending Volume | % Recovery | Initial % Solids | Ending % Solids |
|---|---|---|---|---|
| 20 gallons | 11.7 gallons | 41.49% | 9.18% | 15.69% |

The initial concentration was done at about 100° C. and a pressure of about 90 psi. While further concentration could have been performed, after the initial concentration the feed was very viscous and the flux rates were relatively low due to the viscosity. It was believed that the addition of toluene would cut the viscosity and greatly improve the flux rate. Concentrating was stopped at about 41% recovery, since a significant volume reduction had taken place, the percentage of solids had risen to a respectable level, and flow rates could be improved with toluene addition.

Table 4 shows system performance during the initial concentration.

TABLE 4

Initial Concentration Results

| Initial Flux | Ending Flux | Average Flux | Pressure | Temperature |
|---|---|---|---|---|
| 34.5 gfd | 28.2 gfd | 29.6 gfd | 90 psi | 100° C. |

Diafiltration Process. Once the feed had been volume reduced by 41% and about 11.7 gallons of feed remained, the system configuration was preserved with permeate being diverted to a separate container and the reject line being returned to the feed tank. Also, clean toluene was added to the feed tank in a topped off fashion to maintain the tank level and replenish the feed volume as filtrate was removed.

Processing continued for several days. During the washing study, nine small samples were taken of the permeate and concentrate at different times throughout the washing study. After about 75 gallons of was solvent had been added, the washing process was stopped. Initially, the filtrate was very dark and oily. As the wash process continued, the filtrate became lighter in color until the color was a very light amber. Table 5 shows the mass balance results during the diafiltration.

TABLE 5

Diafiltration Mass Balance Results

| ID | Time | Filtrate Removed | Wash Volume | Permeate Solids | Reject Solids |
|---|---|---|---|---|---|
| 1 | 165 min | 1.8 gal | 0.1x | 1 ppm | 9.77% |
| 2 | 301 min | 3.1 gal | 0.3x | 3 ppm | 9.88% |
| 3 | 906 min | 10.3 gal | 1.0x | 153 ppm | 4.62% |
| 3a | 1117 min | 12.5 gal | 1.3x | 4 ppm | 11.31% |
| 4 | 2362 min | 38.3 gal | 4.0x | 1500 ppm | 7.86% |
| 5 | 2974 min | 58.0 gal | 5.7x | 406 ppm | 24.51% |
| 6 | 3122 min | 61.1 gal | 5.9x | 481 ppm | 41.33% |
| 7 | 3180 min | 61.9 gal | 6.0x | 137 ppm | 38.58% |
| 8 | 3430 min | 71.9 gal | 6.9x | 21 ppm | 25.01% |
| 9 | 3983 min | 80.3 gal | 7.6x | 32 ppm | 42.41% |

Prior to testing, it was estimated that six wash volumes would be enough to theoretically "clean" the solids and remove enough oil. During the course of testing, about 75 gallons of clean toluene were used. Diafiltration was stopped after the supply of toluene was exhausted and after more than six wash volumes had been completed. The ending volume was concentrated until the feed slurry was reasonably thick. Concentration was stopped when the slurry was quite thick and there existed a risk of plugging.

Figure 15:
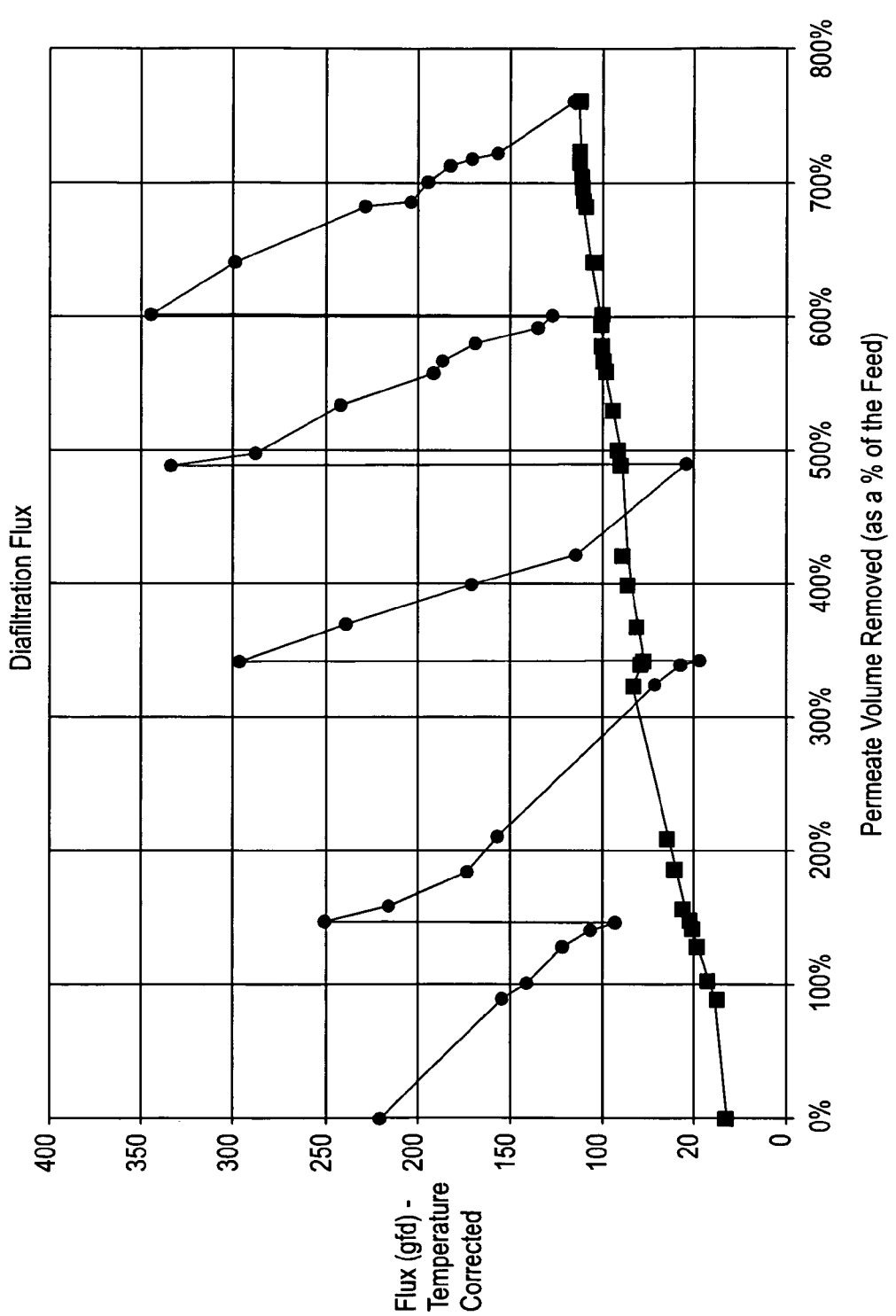
FIG. 15 is a graph of a diafiltration study in an embodiment employing dynamic filtration, e.g., a V*SEP unit.

FIG. 15 is a graph of the diafiltration study. Process conditions included a temperature of 100° C., a pressure of 90 psi, and the Teflon® on woven fiberglass membrane with 0.1 μm pore size. The average flux plot includes data from the initial concentration, not shown in the graph. The actual average flux during testing was 112 gfd.

During testing several observations were made: 1) non-woven fiberglass drain cloth ("Manniglass") did not hold up mechanically; 2) nylon "Tricot" drain cloth did hold up well; 3) polypropylene drain cloth worked acceptably but swelled; 4) when the system sat idle, solids would settle in the piping and plug the system; 5) good pre-screening is needed to catch agglomerations; 6) no significant H2S was present in the sample (300 ppm was present initially but removed); 7) flux rates were low on oil, but improved greatly once toluene was added; 8) Viton® elastomers swelled badly and failed several times; 9) low cross-flow allowed accumulation of solids in the filter head; and 10) a cake layer built up on the membrane surface.

As mentioned above, at first, the filtrate was dark colored, although not turbid. Toward the end of the diafiltration, the color changed to a light amber color. During testing, there were several instances where the filter head was disassembled to replace leaking Viton® seals and failed drain cloth materials. Each time the filter head was opened, the permeate chamber was contaminated with the feed slurry. Upon resumption of operation, the filtrate would exhibit some turbidity initially, and then would clear up as the contamination cleared. Large variations were observed in the percentage of solids in the filtrate. Without wishing to be bound by theory, it is believed that the large variations were observed in the percentage of solids in the filtrate can be explained by permeate chamber contamination.

Table 6 shows the permeate quality after a membrane change.

TABLE 6

Diafiltration Time Results

| ID | Total Time | Delta Time | Permeate Solids |
|---|---|---|---|
|  | 2313 min | 0 min | Membrane Change |
| 4 | 2362 min | 49 min | 1500 ppm |
|  | 2792 min | 0 min | Membrane Change |
| 5 | 2974 min | 182 min | 406 ppm |
| 6 | 3122 min | 330 min | 481 ppm |
| 7 | 3180 min | 388 min | 137 ppm |
| 8 | 3430 min | 638 min | 21 ppm |
| 9 | 3983 min | 1191 min | 32 ppm |

The membrane itself should be able to hold back a significant percentage of solids. Solids in the permeate may not be a result of solids passing through membrane pores. Rather, contamination might have contributed to solids in the filtrate. In addition, swelled Viton® o-rings might have been providing, at best, a marginal seal. Each time the membrane was changed a new set of o-rings was installed. With no contamination of the permeate chamber and with good o-ring seals, the solids in the filtrate might be in the range of about 10-20 ppm.

Figure 16:
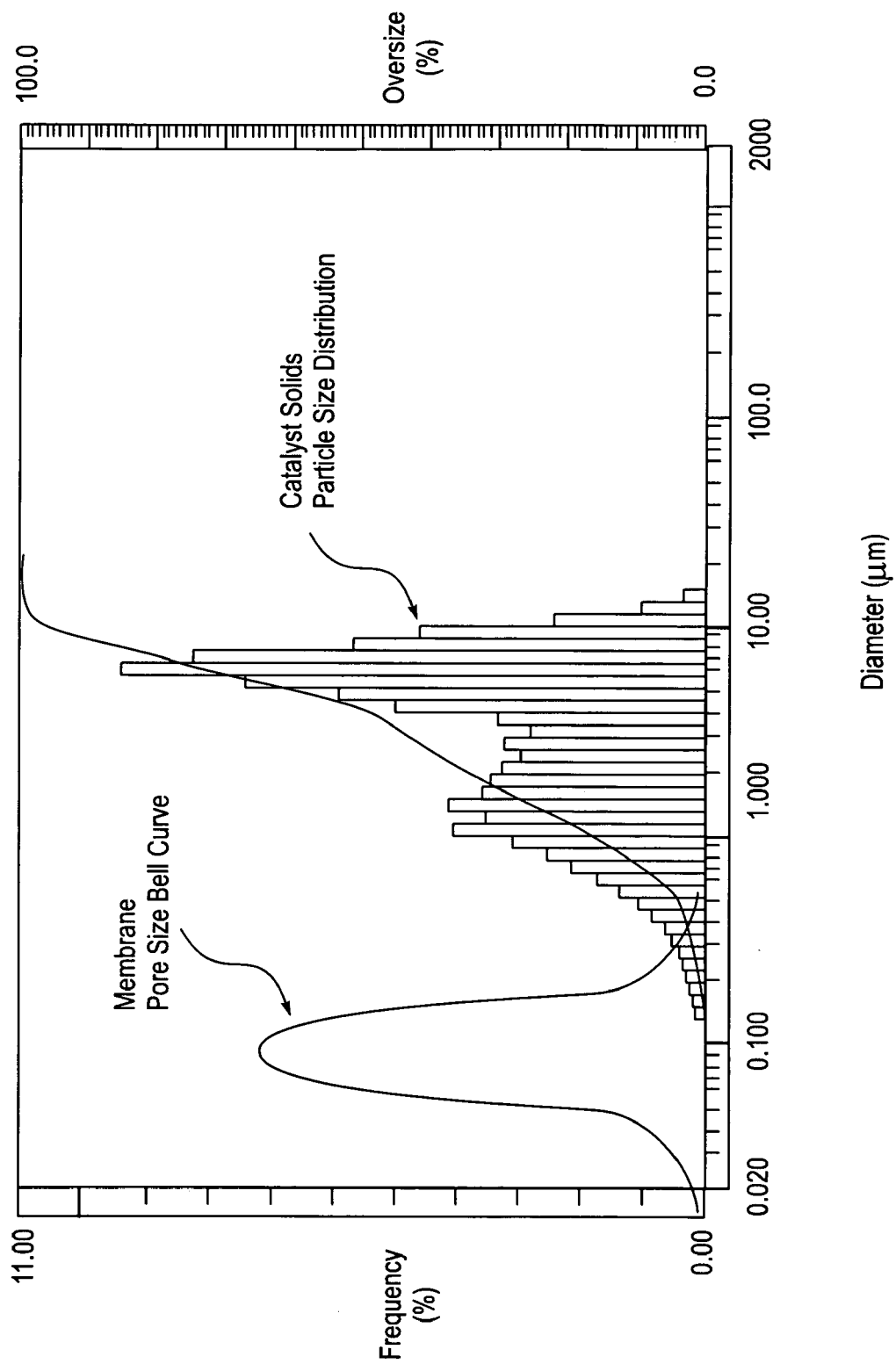
FIG. 16 is a graph of particle size distribution in an embodiment employing dynamic filtration, e.g., a V*SEP unit.

Another possible explanation for the solids in the filtrate is the distribution of pore sizes in the membrane. In particular, while membranes have nominal pore size ratings, the actual pore sizes in any given membrane vary. The pore size distribution curve is shaped like a bell curve. The nominal pore size rating is normally the mean of all the sizes. Thus, a membrane with a nominal pore size rating of 0.1 µm can have pores as large as 1.0 µm. Examining the particle size distribution of the catalyst solids, there could be some overlap, as shown in FIG. 16.

Teflon® membranes rated at 0.05 µm, or smaller, might even be too large to completely remove all solids. While smaller membranes, with pore sizes down to 0.01 µm, made of other materials including polyvinylidene difluoride (PVDF; Kynar®), might have better solids removal capability, such membranes might have lower chemical and temperature tolerance and be less durable over time.

System with Integrated Cross-flow Filtration & Combi Drying Units: A slurry feed stream (100 lbs/hr) from a heavy oil upgrading unit is provided. The stream contains 20 lbs. of spent catalyst in 80 lbs. of heavy oil with the heavy oil being unconverted heavy oil/heavier hydrocracked products. About 300 lbs. of solvent is also provided to the cross-flow filtration unit. The cross-flow filtration unit has a plurality of filter stages with operating conditions as shown in Table 7:

| Filter stage | Temperature (° F.) | Pressure (psig) |
|---|---|---|
| 1 | 200 | 30 |
| 2 | 200 | 50 |
| 3 | 200 | 70 |
| 4 | 200 | 90 |
| 5 | 200 | 110 |

The retentate stream (100 lbs) from the cross-flow filtration unit comprises 20 wt. % spent catalyst, 79.9 wt. % of a solvent such as toluene, and 0.1 wt. % heavy oil is sent to a drying zone connected in series. The filtrate stream contains approximately 220.1 lbs. solvent and 79.9 lbs. heavy oil is sent to a solvent recovery unit.

The drying apparatus used in the $1^{st}$ stage of the drying zone is an LCI Combi Dryer heated indirectly by either steam or hot oil, with an operation temperature of 232° F. in the vertical section, the first half of the horizontal section operating at approximately 800° F. and the last half of the horizontal section (or the cooling section) is between 70 to 77° F. The Combi dryer is maintained at a pressure ranging from 0 to 10 psig, with a counter-current nitrogen flow maintained in the range of 0.5 to 1 scf/min. Dry powder catalyst exiting the Combi dryer at a temperature ranging from 100 to 110° F. and with a retention time in the equipment of 10 to 120 minutes. TGA (thermogravimetic analysis) is used to measure the oil content in the dry catalyst powder, showing a heavy oil concentration of less than 0.5 wt. %.

System with Cross-flow Filtration & Two-Staged Drying Units: The previous example is repeated with the addition of a rotary kiln dryer in series with the Combi dryer. The dry powder from the Combi unit is sent to a rotary kiln dryer at a rate ranging from 4 to 6 lbs. per hour. The kiln operates temperature of about 800° F., having a kiln rotation from 1 to 5 rpm, and a retention time ranging from 30 to 60 minutes. Nitrogen flow is co-current in the rotary kiln. TGA analysis shows a oil concentration in the powder exiting the kiln of less than 0.1 wt %, and at an amount of less than 0.05 wt %. in one embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

What is claimed is:

1. A process for removing hydrocarbons including solvents and heavy oil from catalyst particles, the process comprising:
   providing a composition comprising catalyst particles and 50 to 90 wt. % hydrocarbons;
   passing the composition comprising catalyst particles and hydrocarbons through a drying zone comprising at least two drying apparatuses, wherein the second drying apparatus is operated at a sufficiently high temperature for removing at least 90% of hydrocarbons from the catalyst particles; and removing the catalyst particles from the drying zone as a dry powder.

2. The process of claim 1, wherein the second drying apparatus removes surface active compounds bound onto the catalyst particles.

3. The process of claim 2, wherein the surface active compounds are selected from polar organic compounds, non-polar organic compounds, organo-metallic complexes, inorganic compounds and combinations thereof.

4. The process of claim 2, wherein the surface active compounds are hydrocarbon compounds.

5. The process of claim 2, wherein the surface active compounds are carboxylates.

6. The process of claim 1, wherein the second drying apparatus is a rotary kiln dryer.

7. The process of claim 6, wherein the rotary kiln dryer is operated at a temperature ranging from 700 to 1200° F.

8. The process of claim 6, wherein the rotary kiln dryer is operated at a temperature sufficiently high to volatize surface active compounds bound onto the catalyst particles and reduce the hydrocarbons in the catalyst particles to less than 0.5 wt. %.

9. The process of claim 1, wherein the first drying apparatus is selected from an indirect fired kiln, an indirect fired rotary kiln, an indirect fired dryer, an indirect fired rotary dryer, an electrically heated kiln, an electrically heated rotary kiln, a microwave heated kiln, a microwave heated rotary kiln, a vacuum dryer, a thin film dryer, a flexicoker, a fluid bed dryer, a shaft kiln dryer, a thin film dryer, a thin-film evaporator, a wiped film dryer, and a wiped-film evaporator.

10. The process of claim 1, wherein the first drying apparatus is a vertical thin film dryer.

11. The process of claim 1, wherein the first drying apparatus is a horizontal thin film dryer.

12. The process of claim 1, wherein the first drying apparatus is a thin film dryer having a combined design with a first vertical section and a second horizontal section.

13. The process of claim 12, wherein the vertical section operates at a temperature ranging from 200 to 450° F. and the horizontal section operates at a temperature ranging from 50-100° F.

* * * * *